United States Patent
Innami et al.

(10) Patent No.: US 7,453,179 B2
(45) Date of Patent: Nov. 18, 2008

(54) DC BRUSHLESS MOTOR FOR ELECTRICAL POWER STEERING AND THE PRODUCTION METHOD THEREOF

(75) Inventors: Toshiyuki Innami, Mito (JP); Mitsuaki Mirumachi, Hitachinaka (JP); Osamu Koizumi, Higashiibaraki (JP); Masamichi Yagai, Hitachinaka (JP); Masashi Kitamura, Mito (JP); Takashi Ishigami, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/756,210

(22) Filed: May 31, 2007

(65) Prior Publication Data

US 2007/0222330 A1 Sep. 27, 2007

Related U.S. Application Data

(62) Division of application No. 11/136,423, filed on May 25, 2005, now Pat. No. 7,242,128.

(30) Foreign Application Priority Data

Jun. 3, 2004 (JP) ............................. 2004-165345

(51) Int. Cl.
*H02K 5/00* (2006.01)
(52) U.S. Cl. ............................. 310/89; 310/90; 310/216; 310/254
(58) Field of Classification Search ............. 310/89–90, 310/68 B, 156.01, 156.06, 254, 214–218, 310/259, 261
See application file for complete search history.

(56) References Cited

U.S. PATENT DOCUMENTS

| | | | | |
|---|---|---|---|---|
| 4,015,154 A | * | 3/1977 | Tanaka et al. | 310/42 |
| 5,175,461 A | * | 12/1992 | Zigler et al. | 310/156.28 |
| 5,744,880 A | * | 4/1998 | Kudoh et al. | 310/58 |
| 6,123,167 A | * | 9/2000 | Miller et al. | 180/444 |
| 6,140,728 A | * | 10/2000 | Tomita et al. | 310/156.12 |
| 6,244,374 B1 | * | 6/2001 | Tomita et al. | 180/446 |
| 6,335,582 B1 | * | 1/2002 | Abukawa et al. | 310/214 |
| 6,351,050 B1 | * | 2/2002 | Coles | 310/156.53 |
| 6,356,001 B1 | * | 3/2002 | Nishiyama et al. | 310/156.53 |
| 6,577,030 B2 | * | 6/2003 | Tominaga et al. | 310/68 B |
| 6,759,778 B2 | * | 7/2004 | Nishiyama et al. | 310/156.53 |
| 6,864,605 B2 | * | 3/2005 | Shimizu et al. | 310/68 R |
| 2002/0047460 A1 | * | 4/2002 | Yoneda et al. | 310/216 |
| 2003/0071530 A1 | * | 4/2003 | Takahashi | 310/156.48 |
| 2003/0127933 A1 | * | 7/2003 | Enomoto et al. | 310/194 |

(Continued)

FOREIGN PATENT DOCUMENTS

JP 2001-275325 10/2001
JP 2003-250254 9/2003

OTHER PUBLICATIONS 1 sheet of Form PTO-1449 and 1 sheet of Form PTO-892.

*Primary Examiner*—Thanh Lam
(74) *Attorney, Agent, or Firm*—Crowell & Moring LLP

(57) ABSTRACT

The stator core of a motor comprises an annular back core, and a plurality of tees created separately from the back core and secured onto the inner periphery of the back core. A stator coil is wound on each of the tees by a distributed or concentrated winding method. The stator core and stator coil are formed by molding.

7 Claims, 15 Drawing Sheets

U.S. PATENT DOCUMENTS

2003/0201688 A1* 10/2003 Yamamura et al. .......... 310/216
2003/0230945 A1* 12/2003 Okubo et al. ............... 310/112
2004/0051417 A1* 3/2004 Yamazaki et al. .......... 310/216
2004/0124733 A1* 7/2004 Yamamoto et al. .......... 310/218
2005/0183902 A1* 8/2005 Segawa et al. .............. 180/444
2006/0049713 A1* 3/2006 Toide et al. ................. 310/217

* cited by examiner

FIG. 3

| | NUMBER OF SLOTS S | | | | |
|---|---|---|---|---|---|
| NUMBER OF POLES P | 3 | 6 | 9 | 12 | 15 |
| 2 | ▤ | | | | |
| 4 | ▤ | ▤ | | | |
| 6 | | | ▤ | | |
| 8 | | ▤ | ▨ | | |
| 10 | | | ▨ | ▩ | |

DC BRUSHLESS MOTOR FOR ELECTRICAL POWER STEERING AND THE PRODUCTION METHOD THEREOF

This application is a divisional of U.S. patent application Ser. No. 11/136,423, filed May 25, 2005, the entire disclosure of which is incorporated herein by reference, which in turn claims priority under 35 U.S.C. § 119 of prior Japanese application no. 2004-165345, filed Jun. 3, 2004.

FIELD OF THE INVENTION

The present invention relates to a DC brushless motor for electrical power steering and production method thereof.

BACKGROUND OF THE INVENTION

In the prior art DC brushless motor for electrical power steering, the need for reducing the torque pulsation is known, as described in the Japanese Patent Laid-open No. 2001-275325 and Japanese Patent Laid-open No. 2003-250254.

SUMMARY OF THE INVENTION

Efforts have been made to reduce the torque pulsation, without satisfactory reduction of torque pulsation having been achieved so far. One of the problems to be solved in the DC brushless motor for electrical power steering is how to achieve a further reduction in torque pulsation.

The DC brushless motor for electrical power steering is required to reduce torque pulsation and to generate a large torque as required. For example, when the vehicle is stopped or is slowly running close to the stopped state, if the steering wheel is turned, the aforementioned motor is required to provide a large torque due to the friction coefficient between the steering wheel and ground surface.

To be more specific, another problem of the DC brushless motor for electrical power steering is to find out a way for meeting both requirements for reduction of torque pulsation and production of a large torque, so that torque pulsation can be reduced and a large torque can be produced, whenever required.

The embodiments described below solve various problems found in the DC brushless motor for electrical power steering. These solutions will be described each of the following embodiments:

The present invention provides a DC brushless motor for electrical power steering capable of more effective reduction of torque pulsation.

The DC brushless motor for electrical power steering is most typically characterized in that a stator core is formed by connecting split core pieces, and the stator core and the stator coil built in this stator core are molded by a molding agent, with the stator coil built in this stator core.

The present invention provides a further reduction in torque pulsation.

BRIEF DESCRIPTION OF DRAWINGS

FIG. 3 is an explanatory diagram representing the relationship between the numbers of poles P and slots S in an AC motor;

DESCRIPTION OF THE PREFERRED EMBODIMENTS

The DC brushless motor for electrical power steering of the present invention is most typically characterized as follows:

The present invention provides a DC brushless motor for electrical power steering, driven by polyphase alternating current power, for outputting steering torque, the aforementioned DC brushless motor for electrical power steering comprising a frame, a stator secured on the aforementioned frame and a rotor arranged opposite to the aforementioned stator through an air gap. This stator comprises a stator core and a polyphase stator coil built in the aforementioned stator core.

The stator core, formed by connecting a plurality of split core pieces, comprises an annular back core, and a plurality of tee cores projected radially from the aforementioned back core. A slot is formed on the aforementioned tee core adjacent to the aforementioned stator core, and the aforementioned stator coil is incorporated in the aforementioned slot. The rotor comprises a rotor core, and a plurality of magnets fixed onto the surface of the outer periphery of the rotor core. The stator core and stator coil being molded by a molding agent, with the stator coil incorporated in the stator core.

The method for manufacturing a DC brushless motor for electrical power steering of the present invention is most typically characterized as follows:

The present invention provides a DC brushless motor for electrical power steering manufacturing method, driven by polyphase alternating current power, for outputting steering torque. This manufacturing method comprises a first step of assembling a stator coil into a stator core; a subsequent second step of press-fitting into the frame a plurality of positions of the stator core incorporating the stator coil in the circumferential direction, and obtaining a structure composed of the stator core incorporating the stator coil, secured to the frame; a subsequent third step of mounting a jig on the aforementioned structure in such a way that the jig and frame will enclose the stator core and the coil end of the stator coil protruding axially from the axial end of the stator core; a subsequent fourth step of injecting the molding agent into the space enclosed by the jig and frame, thereby filling the molding agent into the air gap between the coil end and stator core, the air gap of the stator coil, the air gap between stator core and stator coil, and the air gap between the stator core and frame; a subsequent fifth step of solidifying the molding agent; and a subsequent sixth step of removing the jig.

Referring to FIGS. 1 through 9, the following describes the configuration and operation of the DC brushless motor for electrical power steering as an embodiment of the present invention.

Figure 1:
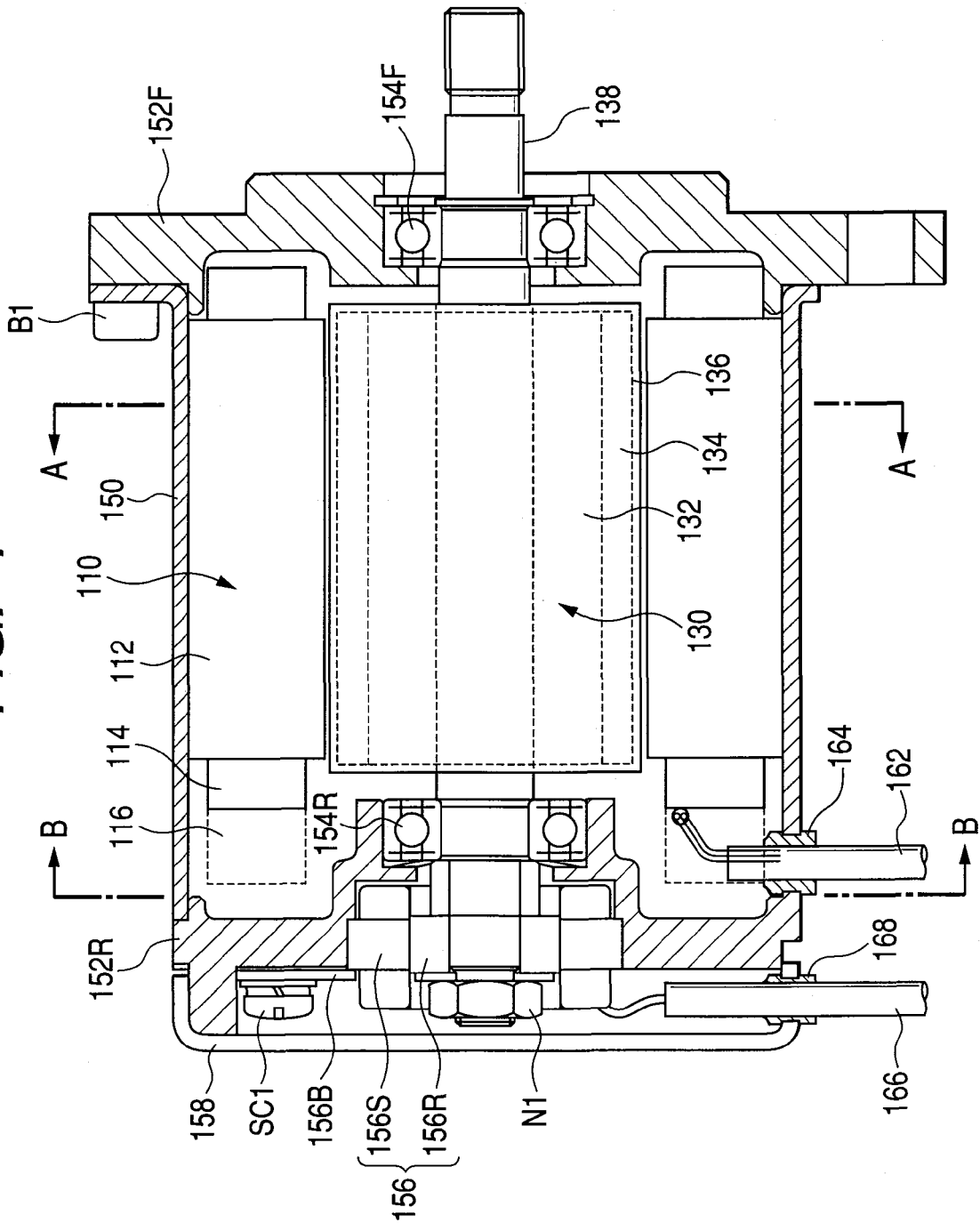
FIG. 1 is a transverse cross sectional view representing the configuration of the DC brushless motor for electrical power steering as an embodiment of the present invention.
Figure 2:
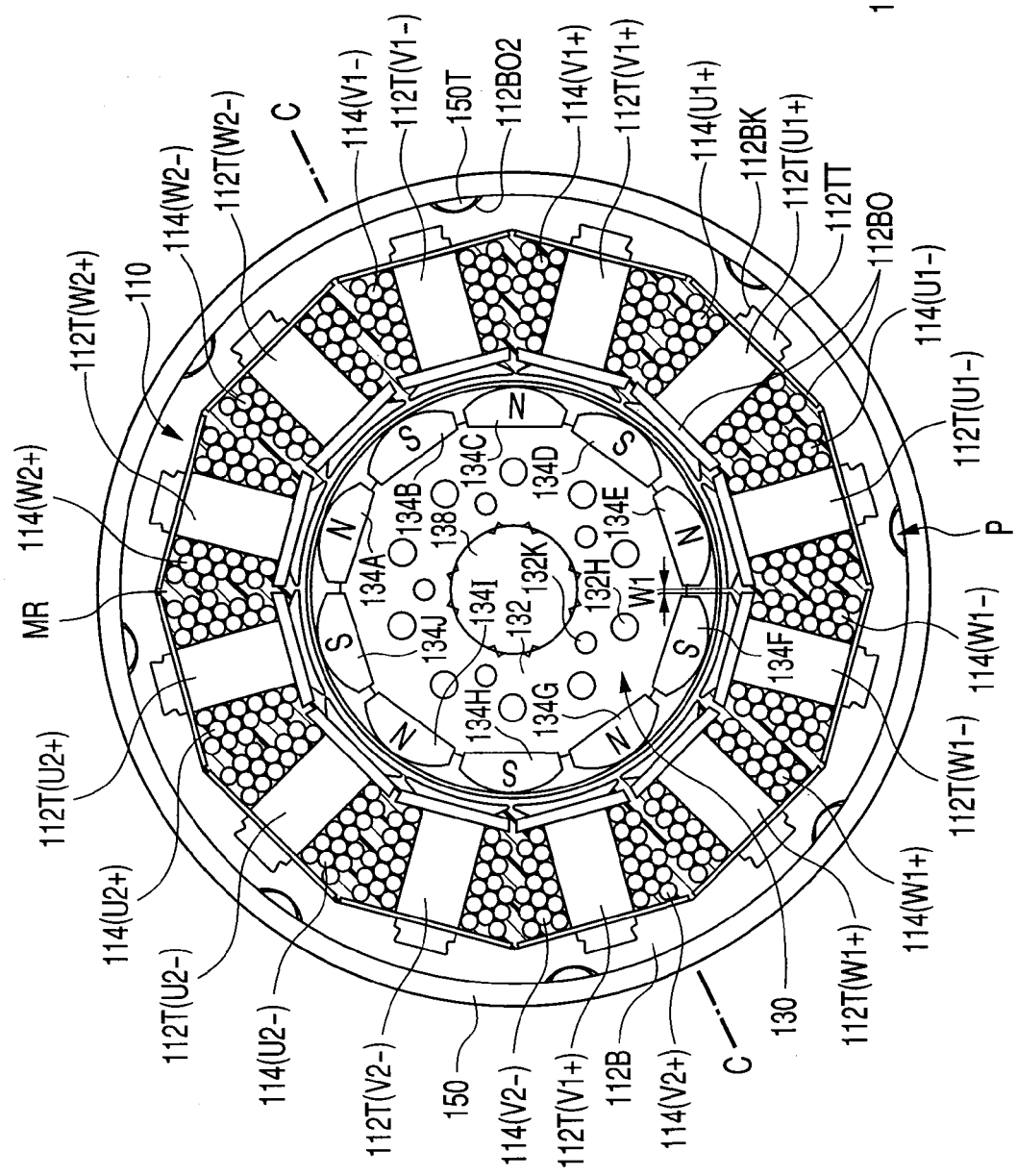
FIG. 2 is a cross sectional view taken along line A-A of FIG. 1.

In the first place, the following describes the configuration and operation of the DC brushless motor for electrical power steering of the present embodiment with reference to FIGS. 1 and 2:

FIG. 1 is a transverse cross sectional view representing the configuration of the DC brushless motor for electrical power steering of the present embodiment of the present invention. FIG. 2 is a cross sectional view taken along line A-A of FIG. 1. FIG. 2(A) is an overall cross sectional view and FIG. 2(B) is a cross sectional view representing the major portions.

The DC brushless motor for electrical power steering (hereinafter referred to as "EPS motor") 100 is a surface magnet type synchronous motor comprising a stator 110 and the rotor 130 rotatably supported inside this stator 110. The EPS motor 100 is driven by an on-board power source equipped with a battery namely, by power supplied from a 14-volt power source (12-volt battery output voltage), a 24-volt power source a 42-volt power source (36-volt battery output voltage), or a 48-volt power source, for example.

The stator 110 comprises a stator core 112 formed of a magnetic substance laminated with a silicon steel plate and a stator coil 114 held inside the slot of the stator core 112. The stator core 112 is composed of an annular back core and a plurality of tees created separately from this back core and mechanically fixed onto the back core thereafter, as will be described later with reference to FIG. 2. Each of the tees is wound with a stator coil 114. The stator coil 114 is wound by a distributed or concentrated winding method.

The stator coil 114 wound according to the distributed winding method is characterized by excellent field weakening control and occurrence of reluctance torque. Downsizing of the motor and reduction of winding resistance are very important for the EPS motor. The length of the coil end of the stator coil 114 can be reduced by concentrated winding of the stator coil 114. This arrangement reduces the length of the EPS motor 100 in the direction of rotary axis. Further, since the length of the coil end of the stator coil 114 can be reduced, the resistance of the stator coil 114 can be reduced, and rise in motor temperature can also be reduced. Reduction in coil resistance minimizes the motor copper loss. Thus, the percentage of the energy consumed by copper loss relative to the entire energy inputted into the motor can be reduced and the efficiency of the output torque relative to input energy can be improved.

As described above, the EPS motor is driven by the power source mounted on a vehicle. The output voltage of the aforementioned power source is often low. A series circuit is equivalently formed by the switching device with an inverter formed across the power source terminal, the aforementioned motor and other current supply circuit connecting means. In the aforementioned circuit, a total of the terminal voltage of the circuit constituent devices becomes the terminal voltage of the aforementioned power source. Thus, the terminal voltage of the motor for supplying power to the motor is lowered. To ensure the current flowing into the motor under this condition, it is crucial to keep the copper loss of the motor low. For this reason, a low-voltage system of 50 volts or less is often used as the power source mounted on a vehicle. The concentrated winding method is preferably applied to the stator coil 114. This is very important especially when a 12-volt power source is used.

The power steering motor is placed close to the steering column or close to a rack-and-pinion mechanism. Downsizing is required in either case. In the downsized structure, the stator winding must be fixed in position. It is also important to make winding work easy. Concentrated winding ensures easier winding work and fixing work than distributed winding.

The end of the stator coil 114 is molded. The EPS motor preferably keeps the torque fluctuation such as cogging torque to a very low level. After the stator section has been assembled, machining may be performed again inside the stator. Chips will be produced by such machining operation. Means must be provided to prevent these chips from entering the end of the stator coil. The coil end is preferably molded. The coil end refers to the position protruding in the axial direction from both axial ends of the stator core 112. In the present embodiment, an air gap is provided between the mold resin covering the end of the stator coil 114 and a frame 150. The molding agent can be filled up to the position coming in contact with the frame 150, a front flange 152F and a rear flange 152R. This arrangement ensures that heat generated from the stator coil 114 is transferred from the coil end through the mold resin directly to the frame 150, front flange 152F and rear flange 152R, and is released to the outside. As compared with heat transmission through air, this method reduces temperature rise of the stator coil 114 effectively.

The stator coil 114 is composed of three phases; U, V and W phases. Each coil is made up of a plurality of unit coils. These unit coils are connected for each phase by a connection ring 116 arranged on the left of the drawing, as will be described with reference to FIG. 3.

The EPS motor is required to provide a large torque. For example, when the vehicle is stopped or is running close to the stopped state, if the steering wheel is turned at a high speed, the aforementioned motor is required to provide a large torque due to the friction coefficient between the steering wheel and ground surface. In this case, a large current is supplied to the stator coil. This current can be 50 amperes or more, although it depends on conditions. Further, it can be 70 or 150 amperes. To ensure safe supply of such a large current and reduce generation of heat by the aforementioned current, it is important to use the connection ring 116. Current is supplied to the stator coil through the connection ring 116, whereby the connection resistance is lowered and voltage drop resulting from copper loss is minimized. This arrangement provides easy supply of a large current and reduces the time constant for current startup caused by the operation of the inverter device.

The stator core 112 and stator coil 114 are molded by resin (electrically insulating type) together to form an integral piece, and constitutes a stator subassembly. This integral stator subassembly is press-fitted into the cylindrical yoke 150 formed of metal such as aluminum and is fixed therein; this integral stator subassembly is molded under this condition. The integral stator subassembly can be molded, with the stator coil 114 built in the stator core 112, and can be press-fitted in position thereafter.

The EPS on board a vehicle is subjected to various forms of vibration, as well as the impact from the wheel. Further, it is used under the condition of a drastic temperature change. It may be exposed to the temperature of 40° Celsius below zero, or 100° C. or more due to temperature rise. Further, means must be taken to prevent water from entering the motor. In order for the stator to be fixed to the yoke 150 under these conditions, the stator subassembly is preferably press-fitted into a cylindrical metal free of any hole such as a screw hole, on the outer periphery of at least the stator core of the cylindrical frame. After pressing fitting, screws may be used to fix it in position, from the outer periphery of the frame. In addition to press fitting, locking is preferably provided.

The rotor 130 comprises a rotor core 132 formed of a magnetic substance laminated with a silicon steel plate; magnets 134 as a plurality of permanent magnets bonded on the surface of the rotor core 132 by adhesive; and a magnet cover 136 composed of non-magnetic substance provided on the outer periphery of the magnets 134. The magnet 134 is a rare-earth magnet and is composed of neodymium, for example. The rotor core 132 is fixed on the shaft 138. A plurality of magnets 134 are bonded on the surface of the rotor core 132 by adhesive. At the same time, the outer periphery is covered with a magnet cover 136, whereby the magnet 134 is prevented from being thrown away. The aforementioned magnet cover 136 is made stainless steel (commonly known as SUS). It can be wound with tape. Use of the stainless steel provides easier production. As described above, the ESP motor is suited to hold the permanent magnet that is subjected to severe vibration and thermal change, and is easy to break down. Even if it breaks down, it is prevented from being thrown away, as described above.

A front flange 152F is arranged on one end of the cylindrical frame 150. The frame 150 and front flange 152F are fixed together by a bolt B1. A rear flange 152R is press-fit into the on the end of the frame 150. A bearing 154F and a bearing 154R are mounted on the front flange 152F and rear flange 152R, respectively. A shaft 138 and a stator 110 fixed on this shaft 138 are rotatably supported by these bearings 154F and 154R.

The front flange 152F is provided with an annular protrusion (or extension). The protrusion of the front flange 152F is extended in the axial direction from the coil end side of the front flange 152F. When the front flange 152F is secured to the frame 150, the tip of the protrusion of the front flange 152F is inserted into the air gap formed between the molding agent of the coil end on the side of the front flange 152F and the frame 150. To encourage heat radiation, the protrusion of the front flange 152F is preferably kept in close contact with the molding agent of the coil end on the side of the front flange 152F.

The rear flange 152R is provided with a cylindrical recess. The recess of the rear flange 152R is concentric with the center axis of the shaft 138, and is located axially inwardly (on the side of the stator core 112) from the axial end of the frame 150. The tip of the recess of the rear flange 152R extends toward the inner diameter side of the coil end on the side of the rear flange 152R, and is located radially opposite to the coil end on the side of the rear flange 152R. A bearing 154 is held by the tip of the recess of the rear flange 152R. The axial end of the shaft 138 on the side of the rear flange 152R extends further inwardly (opposite to the rotor core 132 side) from the bearing 154 to reach the position close to the opening of the recess of the rear flange 152R, or the position protruding slightly outwardly from the opening in the axial direction.

A resolver 156 is arranged in the air gap formed between the inner peripheral surface of the recess of the rear flange 152R and the outer peripheral surface of the shaft 138. The resolver 156 is provided with a resolver stator 156S and is located outwardly (opposite to the rotor core 132 side) from the bearing 154R in the axial direction. The resolver rotor 156R is secured on one end (left end in the drawing) of the shaft 138 by a nut N1. When the resolver holding plate 156B is secured on the rear flange 152R by a screw SC1, the resolver stator 156S is secured on the inner periphery of the recess of the rear flange 152R, and is arranged in opposite position through the resolver rotor 156R and air gap. The resolver 156 is composed of the resolver stator 156S and resolver rotor 156R. The rotation of the resolver rotor 156R is detected by the resolver stator 156S, whereby the positions of a plurality of magnets 134 can be detected. To put it more specifically, the resolver comprises a resolver rotor 156R having a concavo-convex pattern on the outer peripheral surface (e.g. elliptical or petal-shaped), and a resolver stator 156S wound with two output coils (displaced 90° electrically) and exciting coil. When a.c. voltage is applied to the exciting coil, a.c. voltage conforming to the variation in the length of the air gap between the resolver rotor 156R and resolver stator 156S occurs to two output coils, wherein this a.c. voltage has a phase difference in proportion to rotary angle. Thus, the resolver is intended to detect two output voltages having a phase difference. The magnetic pole position of the rotor 130 is detected by finding out the phase angle from the phase angle of the two output voltage having been detected.

Power is supplied from an external battery to each of the U, V and W phases through a power cable 162. The power cable 162 is mounted on the frame 150 by a grommet 164. The magnetic pole position signal detected from the resolver stator 156S is taken out by the signal cable 166. The signal cable 166 is mounted on the rear holder 158 by the grommet 168. The connection ring 116 and part of the power cable 1 are molded together with the coil end.

The following describes the configuration of the stator 110 and rotor 130 more specifically with reference to FIG. 2. FIG. 2 is a view in the direction of the arrow A-A in FIG. 1. FIG. 2(B) is an enlarged cross sectional view of the section P in FIG. 2(A). The same reference numerals as those in FIG. 1 indicate the same parts.

The stator 110 will be described first. The stator core 112 shown in FIG. 1 is composed of an annular back core 112B and a plurality of tees 112T provided separately from this annular back core 112B. The annular back core 112B is made of a lamination of magnetic sheet metals such as silicon steel plate stamped out by press molding.

The tee 112T is composed of twelve independent tees 112T (U1+), 112T (U1−), 112T (U2+), 112T (U2−), 112T (V1+), 112T (V1−), 112T (V2+), 112T (V2−), 112T (W1+), 112T (W1−), 112T (W2+), and 112T (W2−). The tees 112T (U1+), 112T (U1−), 112T (U2+), 112T (U2−), 112T (V1+), 112T (V1−), 112T (V2+), 112T (V2−), 112T (W1+), 112T (W1−), 112T (W2+), and 112T (W2−) are wound with stator coils 114 (U1+), 114 (U1−), 114 (U2+), 114 (U2−), 114 (V1+), 114 (V1−), 114 (V2+), 114 (V2−), 114 (W1+), 114 (W1−), 114 (W2+), and 114 (W2−), respectively in a concentrated winding mode.

Here the stator coil 114 (U1+) and the stator coil 114 (U1−) are wound in such a way that current flows in the opposite directions. The stator coil 114 (U2+) and the stator coil 114 (U2−) are also wound in such a way that current flows in the opposite directions. The stator coil 114 (U1+) and the stator coil 114 (U2+) are wound in such a way that current flows in the same directions. The stator coil 114 (U1−) and the stator coil 114 (U2−) are also wound in such a way that current flows in the same directions. The relation of the directions of current flow for the stator coil 114 (V1+), stator coil 114 (V1−), stator coil 114 (V2+) and stator coil 114 (V2−), and the relation of the directions of current flow for the stator coil 114 (W1+), stator coil 114 (W1−), stator coil 114 (W2+) and stator coil 114 (W2−) are also the same as those in the case of U phases.

Twelve tees 112T and stator coils 114 are manufactured in the same manner. The tee 112T (U1+) and stator coil 114 (U1+) will be taken as an example to explain the assembling process. The stator coil 114 (U1+) is a molded coil formed in such a way as to wind the tees 112T (U1+). The stator coil 114 (U1+) is a pre-molded coil so as to be wound on the tee 112T (U1+). The stator coil 114 (U1+) as the molded coil is molded together with a bobbin 112BO. An integrated piece consisting of the stator coil 114 (U1+) and bobbin 112BO is fitted into the tee 112T (U1+) from its rear. The tip end of the tee 112T (U1+), namely, the side facing the rotor 130 is expanded in the circumferential direction. The bobbin 112BO and stator coil 114 (U1+) serve as stoppers in this expanded section, and are anchored therein. The convex portion 112BK formed on the inner periphery of the back core 112B and a concave portion 112TT shaped for fitting are formed on the rear of the tee 112T (U1+). The concave portion 112TT of the tee 112T (U1+) wound with the molded stator coil 114 (U1+) is press-fitted into the convex portion 112BK of the back core 112B so that the tee 112T (U1+) is fastened on the back core 112B. The above description applies also to the process of mounting the stator coil 114 (U1−) through 114 (W2−) on the other tees 112T (U1+) through 112T (W2−), and the process of mounting the other tees 112T (U1−) through 112T (W2−) on the back core 112B.

Twelve tees 112T equipped with stator coils 114 are secured on the back core 112B, and a plurality of positions on the outer periphery of the back core 112B are press-fitted with the inner periphery of the frame 150. Under this condition, the stator core 112 and stator coil 114 are integrally molded by thermosetting resin MR to form a stator subassembly. In the present embodiment, the stator coil 114 built in the stator core 112 is press-fitted with the frame 150. Under this condition, the stator core 112 and stator coil 114 are integrally molded. This procedure has been described so far. It is also possible to make such arrangements that, with the stator coil 114 is built in the stator core 112, the stator core 112 and stator coil 114 are integrally molded and the stator core 112 is press-fitted with the frame 150 subsequently.

In the processing of molding with molding agent, the jig (not illustrated) is mounted on the structure composed of the stator core 112 and frame 150 in such a way that the stator core 112 and the coil end of the stator coil 114 protruding axially from the axial end of the stator core 112 will be enclosed by the jig (not illustrated) and frame 150. Liquid molding agent is poured into the space enclosed by the jig (not illustrated) and the frame 150, thereby filling the molding agent into the air gap between the core end and stator core 112, the air gap of the stator coil 114, the air gap between stator core 114 and stator coil 114, and the air gap between the stator core 112 and frame 150. Then the molding agent is solidified. After it has solidified, the jig (not illustrated) is removed.

The inner peripheral surfaces of the molded stator subassembly, namely, the tips of the tees 112T (U1−) . . . 112T (W2−) as the surfaces radially opposite to the rotor 130 are provided with machining. This arrangement reduces the variation of the air gap between the stator 110 and rotor 130, and further improves the roundness in the inner diameter of the stator 110. Further, integral molding ensure effective release of the heat generated by electric conduction of the stator coil 114, as compared to the case where integral molding is not adopted. Further, the molding process protects the stator coil and tee against vibration.

For example, when the air gap between the outer periphery of the rotor core of the rotor 130 and the inner periphery of the tee of the stator 110 is 3 mm (3000 μm), the roundness of the inner diameter of about ±30 μm will occur due to the production error of the back core 112B and tee 112T, and assembling error of the back core 112B and tee 112T at the time of press fitting and assembling. The roundness is equivalent to 1% (=30 μm/3000 μm) of the air gap, and therefore a cogging torque is produced by the roundness of inner diameter. However, after molding, the inner diameter is machined. This process reduces the cogging torque resulting from the roundness of the inner diameter. Reduction of the cogging torque improves the steering comfort.

Concave portions 150T are arranged inside the frame 150. Concave portions 112BO2 are arranged on the outer periphery of the back core 112B so as to be engaged with the concave portions 150T. The details are shown in FIG. 2 (B). The concave portions 150T and concave portions 112BO2 constitute an engagement section IP having a mutually different curvature rate for engagement with each other. They are continuously formed in the axial direction. Eight of these portions are arranged at a predetermined interval in the circumferential direction. The engagement section also serves as a press-fit section. To be more specific, when the stator core 112 is secured on the frame 150, the concave portions 112BO2 of the back core 112B are press-fitted into the concave portions 150T of the frame 150 to ensure that the tips of the concave portions 150T of the frame 150 and the bottoms of the concave portions 112B pressed against each other. As can be seen, in the present embodiment, the stator core 112 is secured on the frame 150 by partial press-fitting. This press-fitting process forms a fine air gap between the frame 150 and stator core 112. In the present embodiment, when the stator core 112 and stator coil 114 are molded by a molding agent, the molding agent is filled into the air gap formed between the frame 150 and stator core 112 at the same time. The engagement section serves as a locking section to prevent the stator core 112 from turning in the circumferential direction with respect to the frame 150.

As described above, in the present embodiment, the stator core 112 is partially press-fitted into the frame 150. This arrangement increases the sliding property between the frame 150 and stator core 112 and reduces the rigidity. In the present embodiment, this improves the effect of damping the noise between the frame 150 and stator core 112. In the present embodiment, the air gap between the frame 150 and stator core 112 is filled with the molding agent, whereby the noise damping effect is further improved.

It is also possible to arrange such a configuration that the concave portions 150T and concave portions 112BO2 are formed in a non-contact structure and are used only for locking purposes, and the outer peripheral surface of the back core 112B is press-fitted into the inner peripheral surface of the frame 150 other than the concave portions 150T and concave portions 112BO2.

The stator coil 114 (U1+) and stator coil 114 (U1−), and stator coil 114 (U2+) and stator coil 114 (U2−) are positioned symmetrically, relative to the center of the stator 110. To be more specific, the stator coil 114 (U1+) and stator coil 114 (U1−) are located adjacent to each other, and the stator coil 114 (U2+) and stator coil 114 (U2−) are also located adjacent to each other. Further, the stator coil 114 (U1+) and stator coil 114 (U1−), and stator coil 114 (U2+) and stator coil 114 (U2−) are positioned symmetrically with respect to a line, relative to the center of the stator 110. To put it another way, the stator coil 114 (U1+) and stator coil 114 (U2+) are placed symmetrically with respect to a line, relative to the broken line C-C passing through the shaft 138. Further, the stator coil 114 (U1−) and stator coil 114 (U2−) are placed symmetrically with respect to a line.

Similarly, the stator coil 114 (V1+) and stator coil 114 (V1−), and stator coil 114 (V2+) and stator coil 114 (V2−) are positioned symmetrically with respect to a line. The stator coil 114 (W1+) and stator coil 114 (W1−), and stator coil 114 (W2+) and stator coil 114 (W2−) are also positioned symmetrically with respect to a line.

Further, adjacent stator coils 114 of the same phase are continuously wound in the form of one wire; namely, the stator coil 114 (U1+) and stator coil 114 (U1−) form one wire; namely, the stator coil 114 (U1+) and stator coil 114 (U1−) form one wire, which constitutes two winding coils. They are each inserted into the tees, and are wound on the tees. Similarly, the stator coil 114 (U2+) and stator coil 114 (U2−) are continuously wound in the form of one wire. Similarly, the stator coil 114 (V1+) and stator coil 114 (V1−); stator coil 114 (V2+) and stator coil 114 (V2−); the stator coil 114 (W1+) and stator coil 114 (W1−); and stator coil 114 (W2+) and stator coil 114 (W2−) are continuously wound in the form of one wire, respectively.

Such a symmetric layout with respect to a line and winding of two adjacent coils of the same phase in the form of one wire provide a simplified connection link structure, when the same or difference phases are connected by the connection ring, as will be described later with reference to FIG. 4.

The following describes the configuration of the rotor 130. The rotor 130 comprises:

a rotor core 132 composed of a magnetic substance;

ten magnets 134 (134A, 134B, 134C, 134D, 134E, 134F, 134G, 134H, 134I and 134J) bonded on the surface of the rotor core 132 by adhesive; and a magnet cover 136 arranged on the outer periphery of the magnets 134. The rotor core 132 is secured on the shaft 138.

When the surface (side opposite to the tee 112T of the stator) is an N-pole, the magnets 134 are energized in the radial direction to ensure that the back side thereof (side bonded to the rotor core 132) will be an S-pole. Further, when the surface (side opposite to the tee 112T of the stator) is an S-pole, the magnets 134 are energized in the radial direction in some cases to ensure that the back side thereof (side bonded to the rotor core 132) will be an N-pole. The adjacent magnets 134 are energized in such a way that the energized poles will alternate with each other in the circumferential direction. For example, if the surface of the magnet 134A is attracted by the N-pole, the surfaces of the adjacent magnets 134B and 134J are attracted by the S-pole. To put it another way, when the surfaces of the magnets 134A, 134C, 134E, 134G and 134I are attracted by the N-pole, the magnets 134B, 134D, 134F, 134H and 134J are attracted by the S-pole.

The magnets 134 have a semicylindrical cross section. The semicylindrical shape can be defined as a structure wherein the radial thickness of the right and left in the radial direction is smaller than that at the center in the circumferential direction. Such a semicylindrical structure allows the magnetic flux to be distributed in the form of a sinusoidal wave. Then the induced voltage waveform resulting from the rotation of the EPS motor can be changed into a sinusoidal wave, and the amount corresponding to pulsation can be reduced. Reduction in the amount corresponding to pulsation improves the steering comfort. When a magnet is formed by attraction to the ring-like magnetic substance, by control of the energizing force, the magnetic flux can be distributed in the form similar to the sinusoidal wave, in some cases.

The rotor core 132 is provided with ten large-diameter through-holes 132H formed on the concentric circle and five small-diameter recesses 132K with protruded inner periphery. The rotor core 132 is composed of a lamination of the sheet metal of magnetic substance such as SUS having been stamped out by press molding. The recesses 132K are formed by crimping the sheet metal at the time of press molding. When a plurality of sheet metals are laminated, the recesses 132K are fitted with each other, whereby positioning is performed. The through-hole 132H is intended to cut down the inertia. The rotor balance can be improved by the through-hole 132H. The outer periphery of the magnet 134 is covered by the magnet cover 136 to prevent the magnet 134 from being thrown away. The back core 112B and rotor core 132 can be formed simultaneously from the same sheet metal by stamping out by a press.

As described above, the rotor 130 of the present embodiment has ten magnets 134 and ten poles. Also as described above, twelve tees 112T are provided. The number of slots formed between adjacent tees is 12. To put it another way, the EPS motor of the present invention is a 10-pole 12-slot surface magnetic type synchronous motor.

Figure 3:
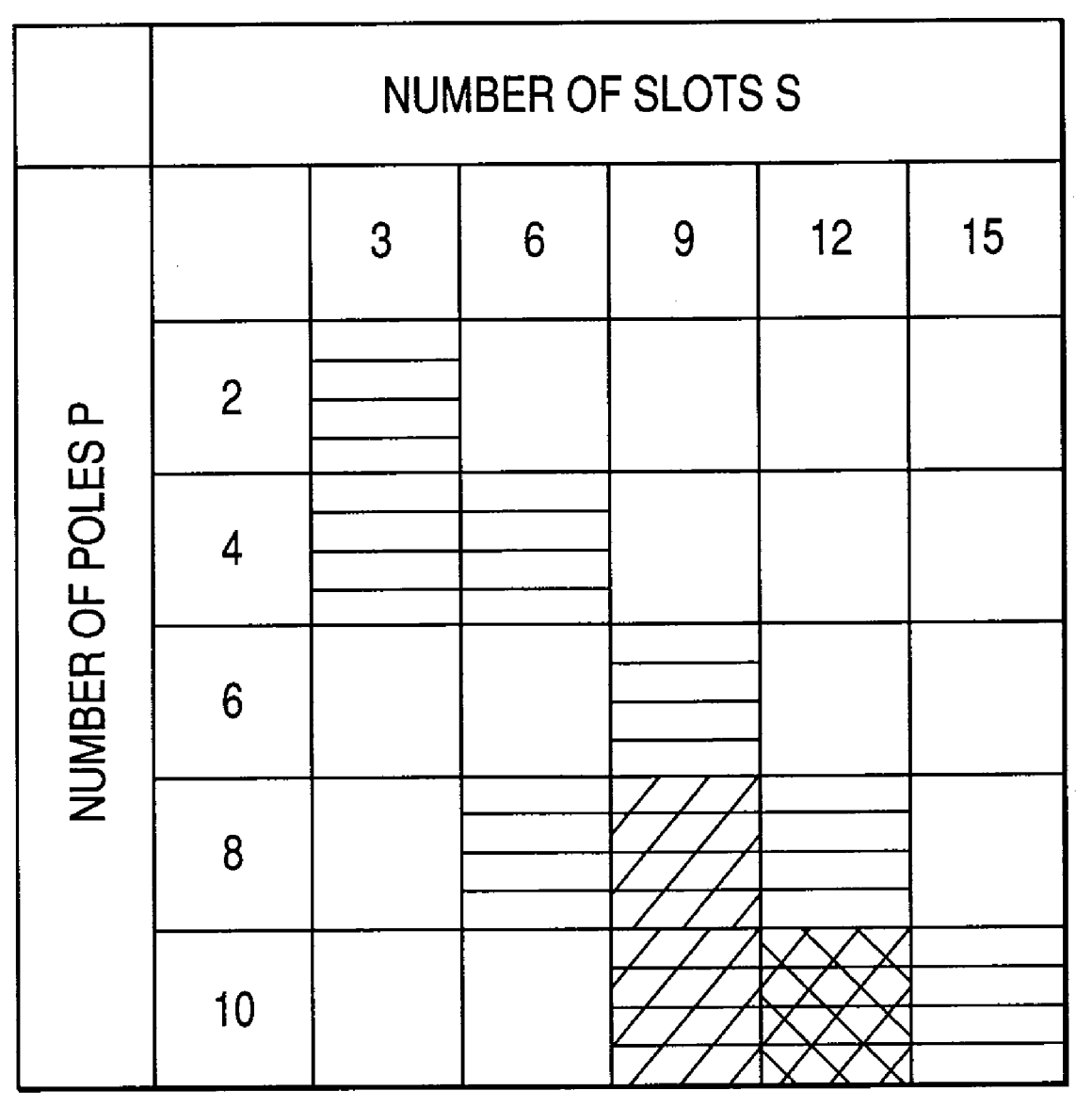

Referring to FIG. 3, the following describes the relationship between the numbers of poles P and slots S in an AC motor.

FIG. 3 is an explanatory diagram representing the relationship between the numbers of poles P and slots S in an AC motor.

In FIG. 3, a combination given by hatching using horizontal lines indicates the relationship between the numbers of poles P and slots S that can be used in a three-phase AC motor (brushless motor). Namely, the available combinations include 2 poles and 3 slots, 4 poles and 3 slots, 4 poles and 6 slots, 6 poles and 9 slots, 8 poles and 6 slots, 8 poles and 9 slots, 8 poles and 12 slots, 10 poles and 9 slots, 10 poles and is 12 slots, and 10 poles and 15 slots. Of these combinations, a 10-pole/12-slot combination provided with right and left oblique lines indicates the numbers of motors and slots in the present embodiment. The 8-pole/9-slot and 10-pole/9-lot combinations shown by 20 left oblique lines will be described later. The EPS motor shown in FIG. 1 is a small-sized motor having an outer diameter of 85 mm. Such a small-sized motor cannot be achieved if the number of poles N is 12 or more, and is therefore not illustrated.

The motors having 2 poles and 3 slots, 4 poles and 3 slots, 4 poles and 6 slots, 6 poles and 9 slots, 8 poles and 6 slots, 8 poles and 12 slots, and 10 poles and 15 slots are provided with similar characteristics. The motor having 6 poles and 9 slots will be take up as an typical example in the following explanation:

The 10-pole/12-slot motor of the present embodiment provides a higher usage rate of the magnetic flux of a magnet than the 6-pole/9-slot AC motor. To be more specific, the 6-pole/9-slot motor has a winding factor (usage rate) (kw) of 0.87 and a skew factor ks of 0.96. The usage rate (kw.ks) of the magnetic flux of the magnet is 0.83. In the meantime, the 10-pole/12-slot motor of the present embodiment has a winding factor (usage rate) (kw) of 0.93 and a skew factor ks of 0.99. Thus, it has a usage rate of 0.92. This means that the 10-pole/12-slot motor of the present embodiment improves the usage rate of the magnetic flux of a magnet (kw.ks).

The period of the cogging torque corresponds to the least common multiple of the numbers of poles P and slots S, and therefore the period of the cogging torque in the 6-pole/9-slot AC motor is 18. Thus, the period of the cogging torque in the 10-pole/12-slot motor of the present embodiment can be reduced to 60. This shows that a reduction of cogging torque is ensured.

Further, the cogging torque resulting from poor roundness of inner diameter can also be reduced. To be more specific, assuming that the cogging torque resulting from the out-of-roundness of inner diameter in the 6-pole/9-slot AC motor is 3.7, that in the 10-pole/12-slot motor of the present embodiment can be 2.4, with the result that the cogging torque resulting from the out-of-roundness of inner diameter can be reduced. Further, in the present embodiment, machining is applied to the inner diameter of the molded stator subassembly to improve the roundness of the inner diameter. This leads to further reduction in the cogging torque resulting from the poor roundness of inner diameter.

Referring to FIG. 4, the following describes the actual measurements of the cogging torque in the DC brushless motor for electrical power steering.

FIG. 4 is an explanatory diagram representing the actual measurements of the cogging torque in the DC brushless motor for electrical power steering of the present embodiment.

Figure 4A:
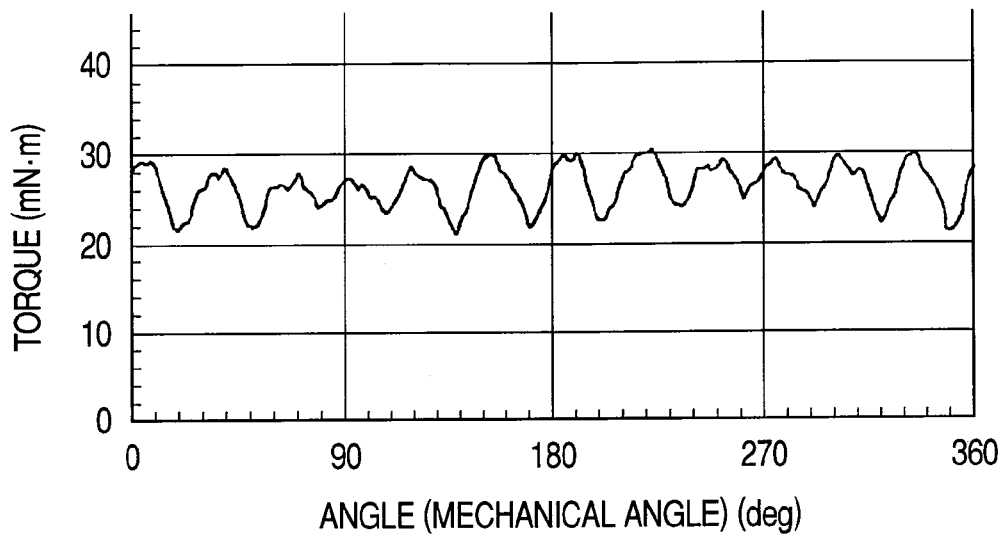
FIG. 4 is an explanatory diagram representing the actual measurements of the cogging torque in the DC brushless motor for electrical power steering of an embodiment in the present invention.
Figure 4B:
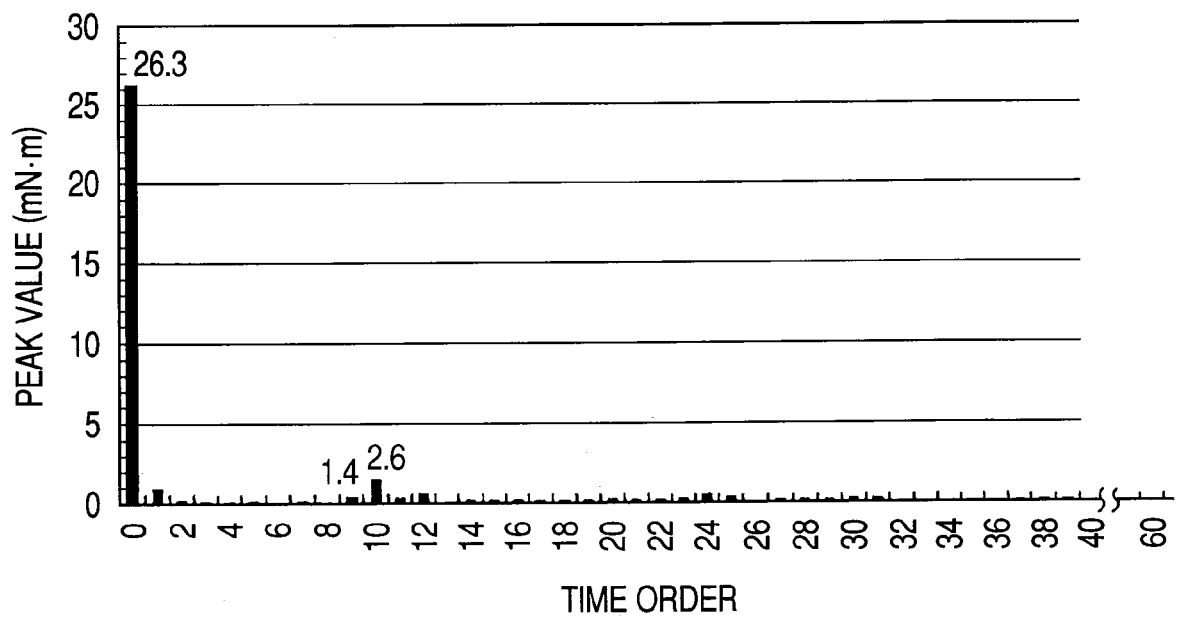

FIG. 4(A) shows the cogging torque measured for the angle (mechanical) ranging from 0 through 360°. FIG. 4(B) shows the peak value (mNm) by separating the high frequency component of the cogging torque shown in FIG. 4(A) for each time order. As described above, time order "60" indicates the period of the cogging torque in a 10-pole/12-slot motor and the cogging torque having occurred is almost zero. Time order "12" is the result of variation in the magnetic field force of the 10-pole magnet. As described above, use of a semicylindrical magnet reduces the cogging torque resulting from variation in magnetic field force down to 1.4. The time order "10" is the result of the variation of each tee of a 12-slot stator. Since the roundness of the inner diameter by cutting subsequent to molding is improved, the cogging torque resulting from variation of the tee is also reduced to 2.6.

Time order "0" indicates a DC.component, so-called a loss torque (friction coefficient produced at a speed of zero). The loss torque can also be lowered to 26.3 mNm. Even when a driver has released the steering wheel, the loss torque is smaller as compared to the restoring force of steering wheel to get back to the original position, with the result that the restoring force of the steering wheel is improved.

As described above, each cogging component can be reduced, the cogging torque can be reduced to 9 mNm, as shown in FIG. 4(A). The maximum torque of the EPS motor is 4.5 mNm, and therefore the cogging torque can be reduce as low as 0.2% (=9 mNm/4.5 Nm) (3/1000 or less of the rated level). The loss torque can also be reduced to 0.57% (=26.3 mNm/4.5 Nm).

The EPS motor 100 of the present embodiment is a motor using an on-board battery (e.g. output voltage of 12 volts) as the power source thereof. The EPS motor 100 is mounted close to the steering system or the rack of a rack/pinion mechanism for transmitting the power of the steering system to the wheel. This requires downsizing due to the limited installation space. In the meantime, a large torque (e.g. 4.5 Nm) is required for power assistance of the steering system.

When an attempt is made to deliver the required torque from the AC servo motor powered by a 100 VAC power source, the motor current of about 5 amperes is sufficient. However, when 14 VAC obtained by DC-to-AC conversion of the 14 VDC is used for driving, as in the present embodiment, the motor current must be 70 through 100 amperes in order to get about the same torque with about the same volume. To get such a large current, the diameter of stator coil 114 must be increased to as large as 1.6 mm. In this case, the number of turns of the stator coil 114 is 14 (T). The number of turns of the stator coil 114 is in the range from 9 through 21, although it depends on the diameter of the stator coil 114. When the diameter of the stator coil 114 is 1.8 mm, the number of turns is 9. Here if the coil having a diameter of 1.6 mm instead of the coil having a diameter of 1.8 is used for winding, coil space factor can be improved by 75%, for example. Since the coil space factor can be improved, the current density can be reduced in relative terms. This arrangement reduces the copper loss and keeps down motor temperature rise. Further, it improves the rpm/torque characteristics. Some of the recent powered vehicles are equipped with a 42-volt battery. In this case, this arrangement reduces the motor current. The number of turns of the stator coil 114 is in the range from 20 through 30.

In the adjacent tees 112T, the space W1 (e.g. tee 112T (U1−) of the expanded section of the tip (side facing the rotor 130) of the tee 112T and the space W1 (circumferential space at the position closest to the circumferential direction) of the expanded section of the tip tee 112T (W1−) are 1 mm. Reducing the tee space in this manner decreases the cogging torque. Even if vibration is applied to the motor, the line of the stator coil 114 is larger than the space W1, and this prevents stator coil 114 from being dropped out on the rotor side. The appropriate space W1 between adjacent tees is 0.5 through 1.5 mm, for example, which is smaller than the diameter of the stator coil 114. As described above, in the present embodiment, the space W1 of the adjacent tees is smaller than the diameter of the stator coil 114.

Figure 5:
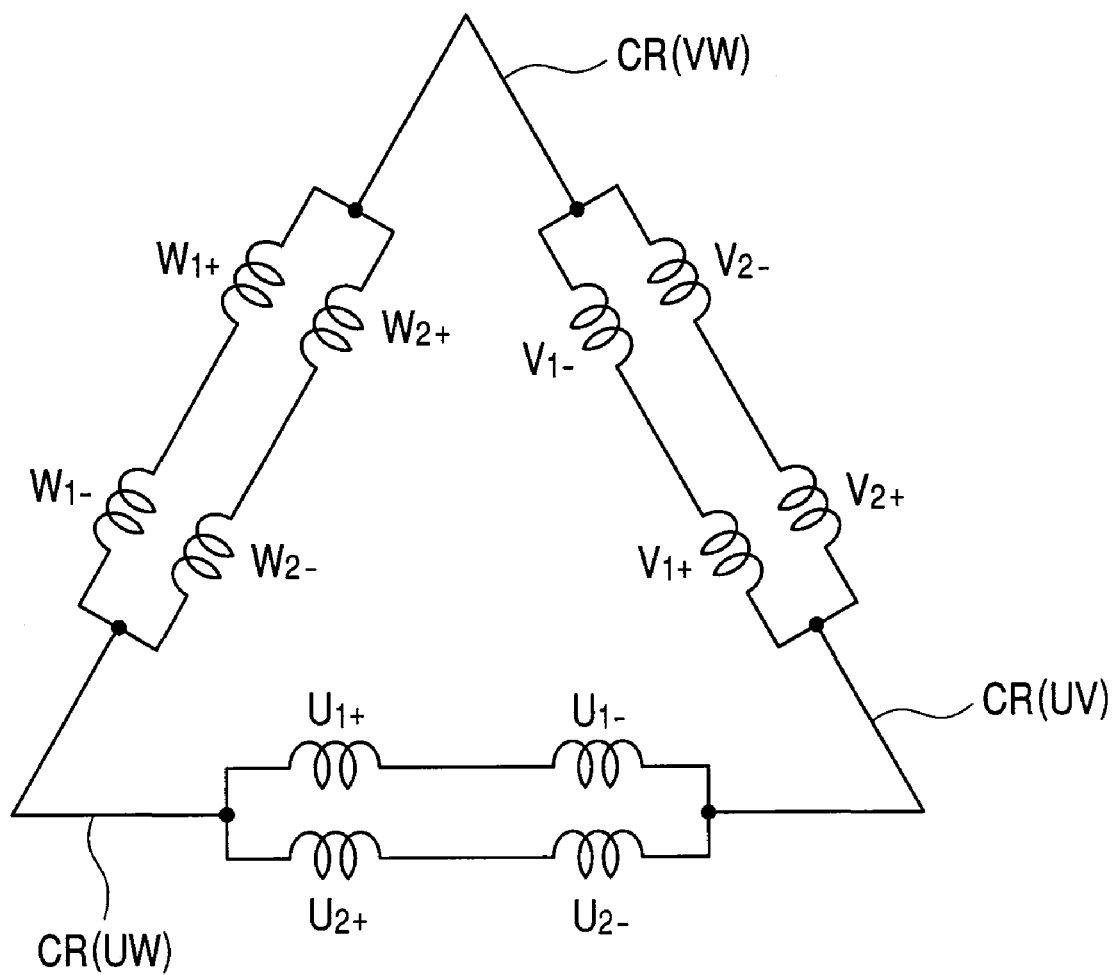
FIG. 5 is a connection diagram of stator coils in the DC brushless motor for electrical power steering according to the present embodiment of an embodiment in the present invention.
Figure 6:
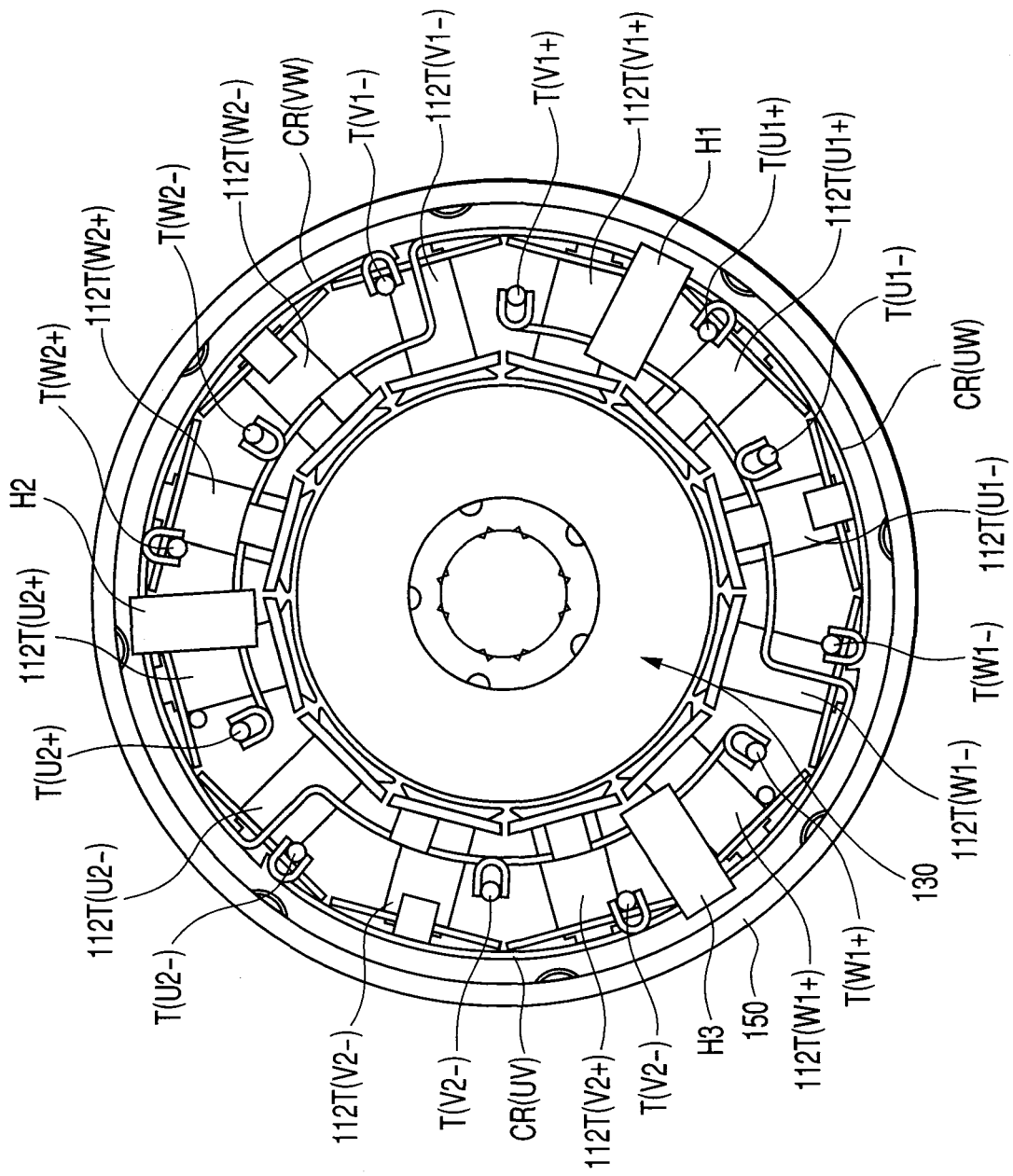
FIG. 6 is a side view representing the electrical connection of the stator coils in the DC brushless motor for electrical power steering according to an embodiment in the present invention.

Referring to FIGS. 5 and 6, the following describes the connection of stator coils in a DC brushless motor for electrical power steering in the present embodiment:

FIG. 5 is a connection diagram of stator coils in the DC brushless motor for electrical power steering according to the present embodiment. FIG. 6 is a side view representing the electrical connection of the stator coils in the DC brushless motor for electrical power steering according to the present embodiment of the present embodiment. FIG. 6 is a view in the direction of the arrow B-B in FIG. 1. The same reference numerals as those in FIG. 2 indicate the same parts.

In FIG. 5, coil U1+ denotes a stator coil 112T (U1+) shown in FIG. 2. Coils U1−, U2+, U2−, V1+, V1−, V2+, V2−, W1+, W1−, W2+, W2− indicate the stator coils 112T (U1−) . . . 112T (W2−) of FIG. 2.

In the stator coil of the present embodiment, a delta connection is used for U, V and W phases. Each phase constitutes a parallel circuit. To be more specific about the U phase, a parallel connection of coil U2+ and coil U2− is provided for the series connection of coil U1+ and coil U1−. Here as described above, the coil U1+ and coil U1− are formed by continuous winding of a wire. This is also applicable to the V and W phases.

A star-connection method can also be used for this connection. The delta connection allows the lower terminal voltage than the star connection. For example, assuming that the voltage across the series/parallel circuit of the U phase is E. The terminal voltage is E, but this is $\sqrt{3}$ E in the star connection. Since the terminal voltage can be reduced, the number of turns of the coil can be increased and a small-diameter wire can be utilized. Further, as compared to the case of four coils in series, a parallel circuit reduces the current flowing to each coil, and this allows use of a smaller-diameter wire and improves the coil space factor, with the result that better bending properties and easier in production are ensured.

Referring to FIGS. 5 and 6, the following describes the connection method for three phases and each phase, using a connection ring.

As shown in FIG. 5, coils U1−, U2−, V1+ and V2+ are connected by the connection ring CR (UV); coils V1−, V2+, W1+ and W2+ are connected by the connection ring CR (VW); and coils U1+, U2+, W1− and W2− are connected by the connection ring CR (UW). Through these connections, a three-phase delta connection is made.

As shown in FIG. 6, three connection rings CR (UV), CR (VW) and CR (UW) are used. The connection rings CR (UV), CR (VW) and CR (UW) are formed by bending and machining the bus bar type connection board bent in a circular arc so as to feed a large current. Each of the connection rings has the same shape. For example, the connection ring CR (UV) is formed by a connection between a circular arc of a small radius and a circular arc of a large radium. Other connection rings CR (VW) and CR (UW) are made in the same structure. These connection rings CR (UV), CR (VW) and CR (UW) are retained by the holders H1, H2 and H3 in the state displaced 120° in the circumferential direction. The connection ring CR and holders H1, H2 and H3 are molded together with the coil end using a molding agent.

In the meantime, in FIG. 6 the stator coil terminal T (U1+) is one terminal of the stator coil 114 (U1+) wound with the stator coil 112T (U1+). The stator coil terminal T (U1+) is one terminal of the stator coil 114 (U1−) wound with the stator coil 112T (U1−) As described above, the stator coil 114 (U1+) and stator coil 114 (U1−) are form a continuous coil in the form of one wire. Two terminals T (U1+) and T (U1−) are present for two coils, stator coil 114 (U1+) and stator coil 114 (U1−). The stator coil terminals T (U2+), T (U2−), T (V1+), T (V1−), T(V2+), T(V2−), T (W1+), T (W1−), T (W2+) are T (W2−) are the terminals on one side of the stator coil 114 (U2+), . . . (W2+).

The stator coil terminals T (U1−), (U2−), (V1+) and (V2+) are connected by the connection ring CR (UV), whereby the coils U1−, U2−, V1+ and V2+ shown in FIG. 5 are connected by the connection ring CR (UV). The stator coil terminal T (V1−), T (V2−), T (W1+) and T (W2+) are connected by the connection ring CR (VW), whereby the coils V1−, V2−, W1+ and W2+ shown in FIG. 5 are connected by the connection ring CR (UW).

Figure 7:
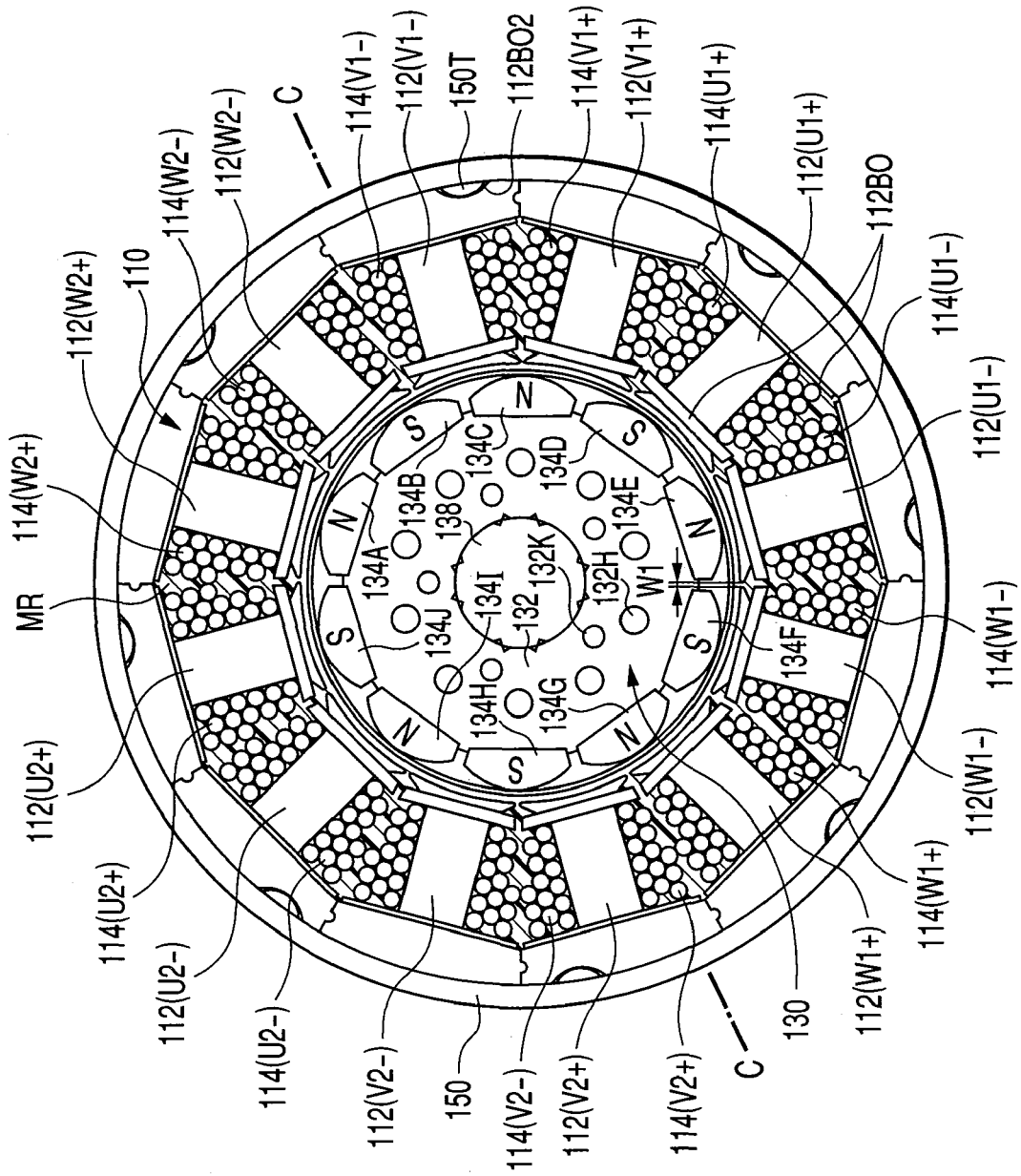
FIG. 7 is a view in the direction of the arrow A-A in FIG. 1, showing the configuration of another stator.

Referring to FIG. 7, the following describes another example of the configuration of the stator 110. FIG. 7 is a view in the direction of the arrow A-A in FIG. 1. The same reference numerals as those in FIG. 2 indicate the same parts.

In the stator 110 shown in FIG. 2, the stator core 112 is composed of an annular back core 112B and a plurality of tees 112T provided separately from this annular back core 112B. By contrast, in the present example, it is composed of twelve T-shaped tee-integrated split back cores; 112 (U1+), 112 (U1−) 112 (U2+), 112 (U2−), 112 (V1+), 112 (V1−), 112 (V2+), 112 (V2−), 112 (W1+), 112 (W1−) and 112 (W2+), 112 (W2−). To be more specific, the annular back core 112B of FIG. 2 is split into twelve pieces in the circumferential direction. A tee is integrated with each of the split back core piece. The tee-integrated split back cores 112 (U1+) . . . 112 (W2−) are composed of a lamination of the sheet metal of magnetic substance such as a silicon steel plate having been stamped out by press molding. The rotor 130 is formed as shown in FIG. 2.

Stator coils 114 (U1+), 114 (U1−), 114 (U2+) 114 (U2−), 114 (V1+), 114 (V1−), 114 (V2+), 114 (V2−), 114 (W1+), 114 (W1−), 114 (W2+) and 114 (W2−) are wound on the tees of the tee-integrated split back cores 112 (U1+) . . . 112 (W2−), namely, on twelve independent tees 112T (U1+) . . . 112T (W2−), in a concentrated winding. The stator coil 114 (U1+) . . . 114 (W2−) is wound in the direction shown in FIG. 2.

The stator coils 114 (U1+) . . . 114 (W2−) are wound on the tee-integrated split back cores 112 (U1+) . . . 112 (W2−), respectively. Then the fitting type convex portions are press-fitted into the concave portions formed on the end faces of the tee-integrated split back cores 112 (U1+) . . . 112 (W2−) in the circumferential direction, whereby assembling of the stator 110 terminates. A plurality of positions on the outer periphery of the back core 112B are press-fitted with the inner periphery of the frame 150. Under this condition, the stator core 112 and stator coil 114 are integrally molded by thermosetting resin MR to form a stator subassembly. In the present embodiment has referred to the case where the stator coil 114 built in the stator core 112 is press-fitted with the frame 150. Under this condition, the stator core 112 and stator coil 114 are integrally molded. This procedure has been described so far. It is also possible to make such arrangements that, with the stator coil 114 is built in the stator core 112, the stator core 112 and stator coil 114 are integrally molded and the stator core 112 is press-fitted with the frame 150 subsequently.

In the processing of molding with molding agent, the jig (not illustrated) is mounted on the structure composed of the stator core 112 and frame 150 in such a way that the stator core 112 and the coil end of the stator coil 114 protruding axially from the axial end of the stator core 112 will be enclosed by the jig (not illustrated) and frame 150. Liquid molding agent is poured into the space enclosed by the jig (not illustrated) and the frame 150, thereby filling the molding agent into the air gap between the core end and stator core 112, the air gap of the stator coil 114, the air gap between stator core 114 and stator coil 114, and the air gap between the stator core 112 and frame 150. Then the molding agent is solidified. After it has solidified, the jig (not illustrated) is removed.

The inner peripheral surfaces of the molded stator subassembly, namely, the tips of the tees of the tee-integrated split back cores 112 (U1+) . . . 112 (W2−) as the surfaces radially opposite to the rotor 130 are provided with machining. This arrangement reduces the variation of the air gap between the stator 110 and rotor 130, and further improves the roundness in the inner diameter of the stator 110. Further, integral molding ensure effective release of the heat generated by electric conduction of the stator coil 114, as compared to the case where integral molding is not adopted. Further, the molding process protects the stator coil and tee against vibration. Further, machining of the inner diameter subsequent to molding reduces the cogging torque resulting from the roundness of the inner diameter. Reduction of the cogging torque improves the steering comfort of the steering system.

Concave portions 150T are arranged inside the frame 150. Concave portions 112BO2 are arranged on the outer periphery of the back core 112B so as to be engaged with the concave portions 150T. The concave portions 150T and concave portions 112BO2 constitute an engagement section IP having a mutually different curvature rate for engagement with each other. They are continuously formed in the axial direction. Eight of these portions are arranged at a predetermined interval in the circumferential direction. The engagement section also serves as a press-fit section. To be more specific, when the stator core 112 is secured on the frame 150, the concave portions 112BO2 of the back core 112B are press-fitted into the concave portions 150T of the frame 150 to ensure that the tips of the concave portions 150T of the frame 150 and the bottoms of the concave portions 112B pressed against each other. As can be seen, in the present embodiment, the stator core 112 is secured on the frame 150 by partial press-fitting. This press-fitting process forms a fine air gap between the frame 150 and stator core 112. In the present embodiment, when the stator core 112 and stator coil 114 are molded by a molding agent, the molding agent is filled into the air gap formed between the frame 150 and stator core 112 at the same time. The engagement section serves as a locking section to prevent the stator core 112 from turning in the circumferential direction with respect to the frame 150.

As described above, in the present embodiment, the stator core 112 is partially press-fitted into the frame 150. This arrangement increases the sliding property between the frame 150 and stator core 112 and reduces the rigidity. In the present embodiment, this improves the effect of damping the noise between the frame 150 and stator core 112. In the present embodiment, the air gap between the frame 150 and stator core 112 is filled with the molding agent, whereby the noise damping effect is further improved.

It is also possible to arrange such a configuration that the concave portions 150T and concave portions 112BO2 are formed in a non-contact structure and are used only for locking purposes, and the outer peripheral surface of the back core 112B is press-fitted into the inner peripheral surface of the frame 150 other than the concave portions 150T and concave portions 112BO2.

Figure 8:
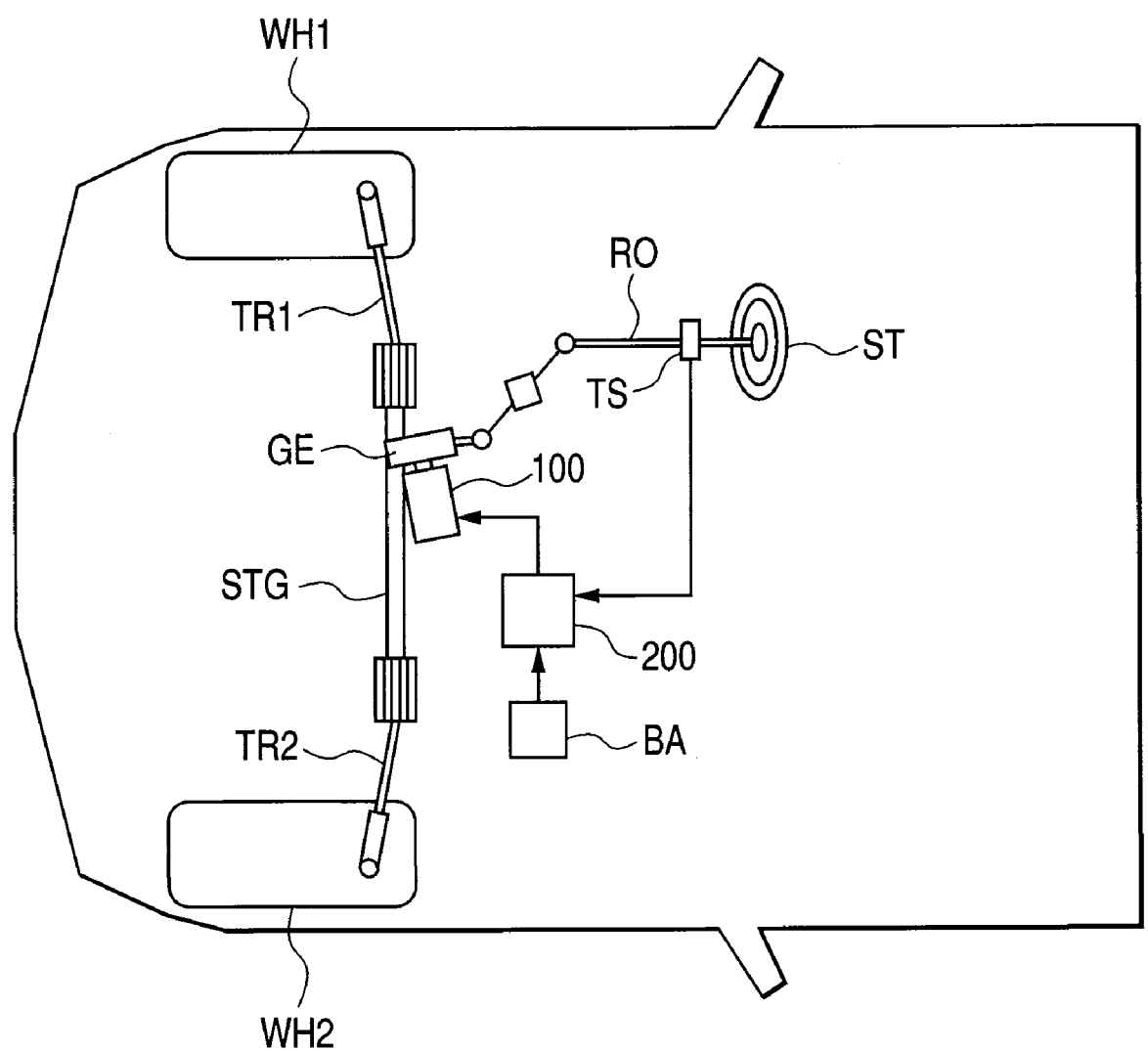
FIG. 8 is a system configuration diagram representing the configuration of a steering system using the DC brushless motor for electrical power steering according to an embodiment in the present invention.

Referring to FIG. 8, the following describes the configuration of a steering system using the DC brushless motor for electrical power steering of the present invention.

FIG. 8 is a system configuration diagram representing the configuration of a steering system using the DC brushless motor for electrical power steering of the present embodiment.

When the steering ST is turned, the rotation drive force is decelerated by a manual steering gear STG through the rod RO and is transmitted to right and left tie rods TR1 and T2 to steer the right and left wheel WH1 and WH2.

The EPS motor 100 of the present embodiment is mounted close to the manual steering gear STG. The drive force is transmitted to the manual steering gear STG through a gear GE. The rod RO is equipped with a torque sensor TS, which detects the rotation drive force (torque) applied to the steering ST. Based on the torque sensor TS, the controller 200 controls the current supplied to the motor in such a way that the output torque of the EPS motor 100 will be the target torque. The controller 200 and EPS motor 100 is supplied with power from a battery BA.

The aforementioned configuration indicates a rack type power steering system with the EPS motor mounted close to the rack/pinion mechanism. The EPS motor 100 of the present invention is also applicable to a column type power steering system with the EPS motor mounted close to the steering system.

Figure 9:
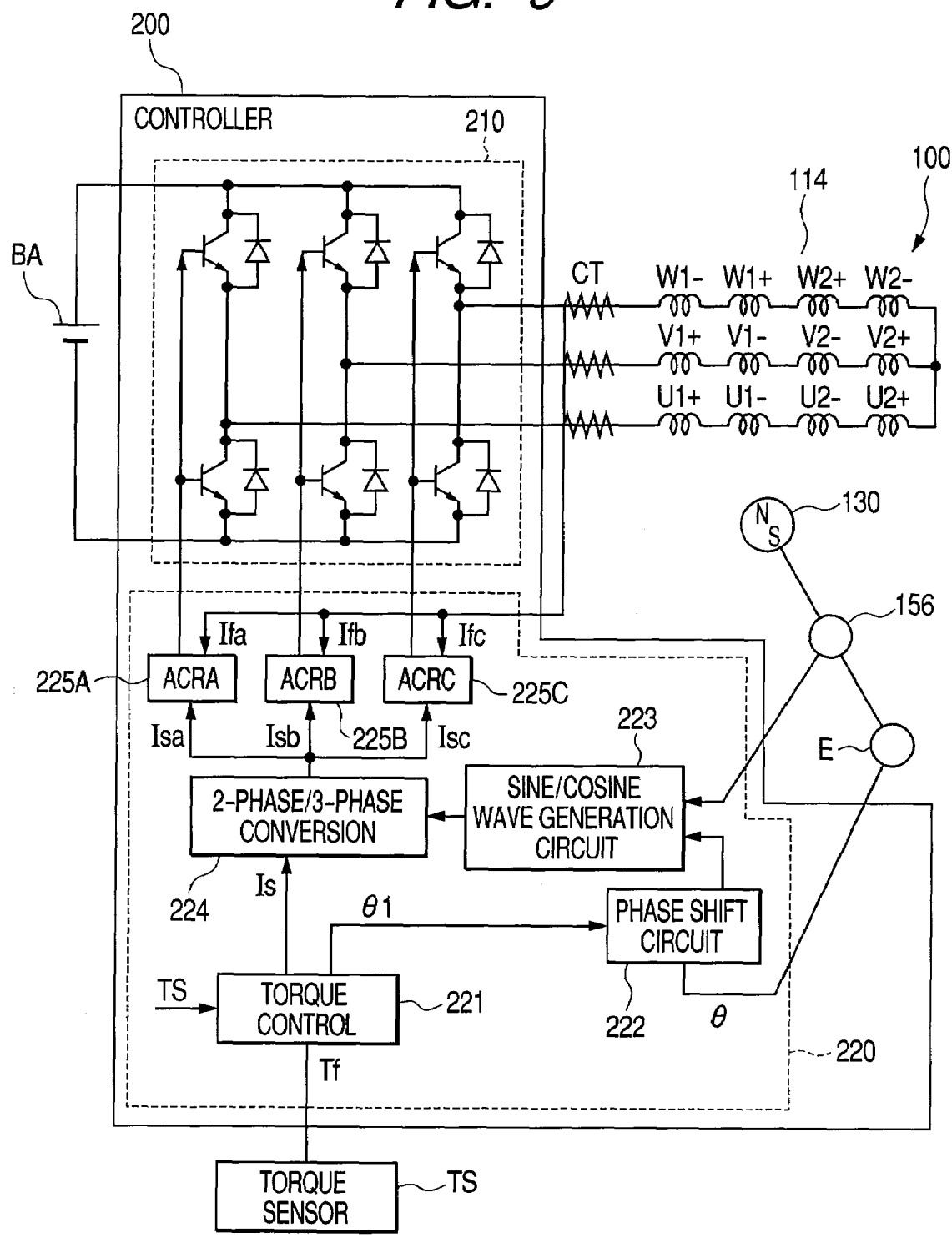
FIG. 9 is a function block diagram representing the configuration of the controller for controlling the DC brushless motor for electrical power steering of an embodiment in the present invention.

Referring to FIG. 9, the following describes the configuration of a controller for controlling the DC brushless motor for electrical power steering of the present embodiment.

FIG. 9 is a function block diagram representing the configuration of the controller for controlling the DC brushless motor for electrical power steering of the present invention.

The controller 200 comprises a power module 210 having a function as an inverter; and a control module 220 for controlling the power module 210. The DC voltage from the battery BA is converted to the 3-phase AC voltage by the power module 210 having a function as an inverter, and is supplied to the stator coil 114 of the EPS motor 100.

The torque control 221 in the control module 220 calculates the torque Te based on the torque Tf of the steering ST detected by the torque sensor TS and the target torque Ts, and outputs the torque command, i.e. current command Is and rotary angle $\theta 1$ of the rotor 130 thereto by the PI control (P: proportional item; I: integration item).

The phase shift circuit 222 outputs the pulse from the encoder E, i.e. the position information $\theta$ of the rotor by shifting the phase thereof, in response to the command of the rotary angle $\theta 1$ from the torque control circuit (ASR) 221. Based on the position information $\theta$ of the resolver 156 for detecting the position of the pole of permanent magnet and the rotor with its phase shifted by the phase shift circuit 222, a sine/cosine wave generator 2223 outputs the sinusoidal wave obtained by shifting the phase of the induction voltage of each of the windings (three-phase in this case) of the stator coil.

The 2-phase/3-phase conversion circuit 224 outputs the current commands Isa, Isb and Isc to respective phases in response to the current command Is from the torque control circuit (ASR) 221 and the output from the sine/cosine wave generator 223. These phases are separately provided with current control systems 225A, 225B and 225C, respectively. The 2-phase/3-phase conversion circuit 224 sends the signals conforming to the current commands Isa, Isb and Isc, and current detection signals Ifa, Ifb and Ifc from the current detector CT, to the inverter 210 to control the currents of these phases.

The aforementioned description refers to the 10-pole/12-slot EPS motor. The following describes the 8-pole/9-slot EPS motor and 10-pole/9-slot EPS motor with reference to the hatched area in FIG. 3.

The 8-pole/9-slot and 10-pole/9-slot motors provide a higher usage rate of the magnetic flux of a magnet than the 6-pole/9-slot AC motor. To be more specific, the 6-pole/9-slot AC motor has a usage rate of the magnetic flux of a magnet (kw.ks) of 0.83. In the meantime, the 8-pole/9-slot and 10-pole/9-slot motors have a winding factor (kw) of 0.95 with a skew factor (ks) of 1.00. Thus, the 8-pole/9-slot and 10-pole/9-slot motors have a usage rate (kw.ks) of 0.94. This means that the 8-pole/9-slot motor and 10-pole/9-slot motors improve the usage rate of the magnetic flux of a magnet (kw.ks).

The period of the cogging torque corresponds to the least common multiple of the numbers of poles P and slots S, and therefore the period of the cogging torque in the 6-pole/9-slot AC motor is 18. Thus, the period of the cogging torque in the 8-pole/9-slot and 10-pole/9-slot motors can be reduced to 72. This shows that a reduction of cogging torque is ensured.

Further, the cogging torque resulting from poor roundness of inner diameter can also be reduced. To be more specific, assuming that the cogging torque resulting from the out-of-roundness of inner diameter in the 6-pole/9-slot AC motor is 3.7, that in the 8-pole/9-slot and 10-pole/9-slot motors can be 1.4, with the result that the cogging torque resulting from the out-of-roundness of inner diameter can be reduced. Further, machining is applied to the inner diameter of the molded stator subassembly to improve the roundness of the inner diameter. This leads to further reduction in the cogging torque resulting from the poor roundness of inner diameter.

In the 8-pole/9-slot and 10-pole/9-slot motors, parallel connection of the series circuit of the coil U2+ and coil U2− cannot be configured as viewed from the U phase, with respect to the series circuit of the coil U1+ and coil U1−, as in the 10-pole/12-slot EPS motor described above with reference to FIG. 5. This requires a series connection of the coil U1+, coil U1−, coil U2+ and coil U2−.

Referring to FIGS. 10 through 16, the following describes the controller of the DC brushless motor for electrical power steering of the present embodiment.

Figure 10:
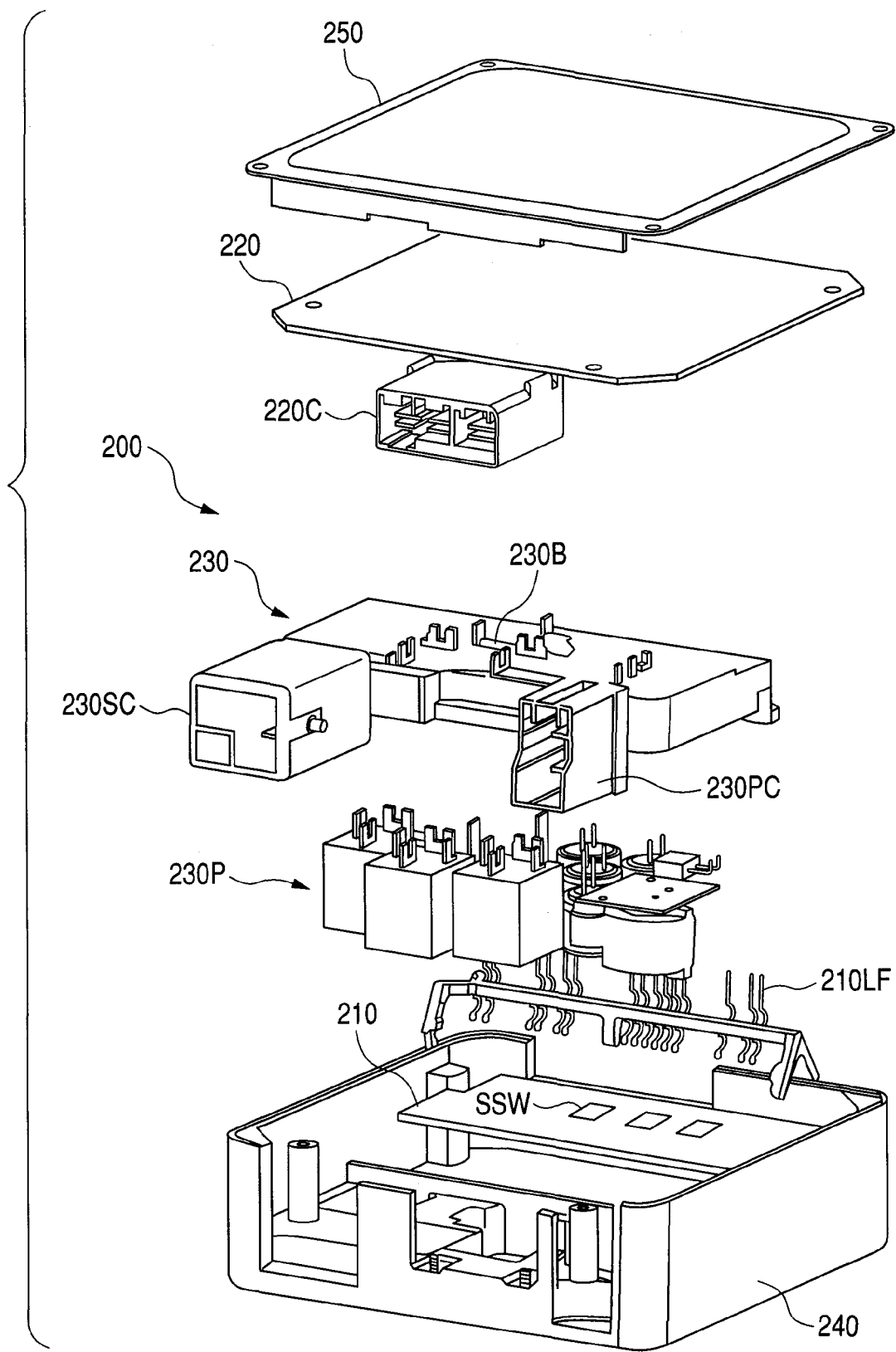
FIG. 10 is a perspective exploded view representing the configuration of the controller of the DC brushless motor for electrical power steering of an embodiment in the present invention.

FIG. 10 is a perspective exploded view representing the configuration of the controller of the DC brushless motor for electrical power steering of the present embodiment.

As shown in FIG. 10, the motor controller 200 comprises a power module 210, a control module 220, a conductor module 230, a case 240 and a shield cover 250.

In the power module 210, a wiring pattern is formed on a metallic substrate through an insulator. A semiconductor switching device SSW such as a MOSFET (metal oxide semiconductor field-effect transistor) described with reference to FIG. 9 is mounted on the wiring pattern. The power module 210 is fixed with one end of each of multiple lead frames 210 LF by soldering. The lead frames 210 LF is used for electrical connection of the power module 210 and control module 220.

In the control module 220, a CPU and driver circuit are mounted on the PCB substrate. In the illustrated state, the CPU and driver circuit are mounted on the lower surface of the substrate. The signal connector 220C is mounted on the control module 220.

The conductor module 230 is integrally connected with the bus bar 230B as a power line by molding. At the same time, it is connected integrally with the motor connector 230 SC as a terminal for supplying motor current to the motor and the power connector 230 PC by molding. The parts 230P such as a relay coil and a capacitor are mounted in advance on the conductor module 230. The terminal of the parts 230P and bus bar 230B are secured by TIG welding (arc welding).

The case 240 is made of aluminum. At the time of assembling, the power module 210 and conductor module 230 are fixed by screws in the case 240. The control module 220 is also fixed by screws on the power module 210 and conductor module 230. The multiple ends of the lead frames 210 LF is connected with the terminal of the control module 220 by soldering. The shield cover 250 is fixed by screws in the final step, whereby the motor controller 200 is manufactured.

Figure 11:
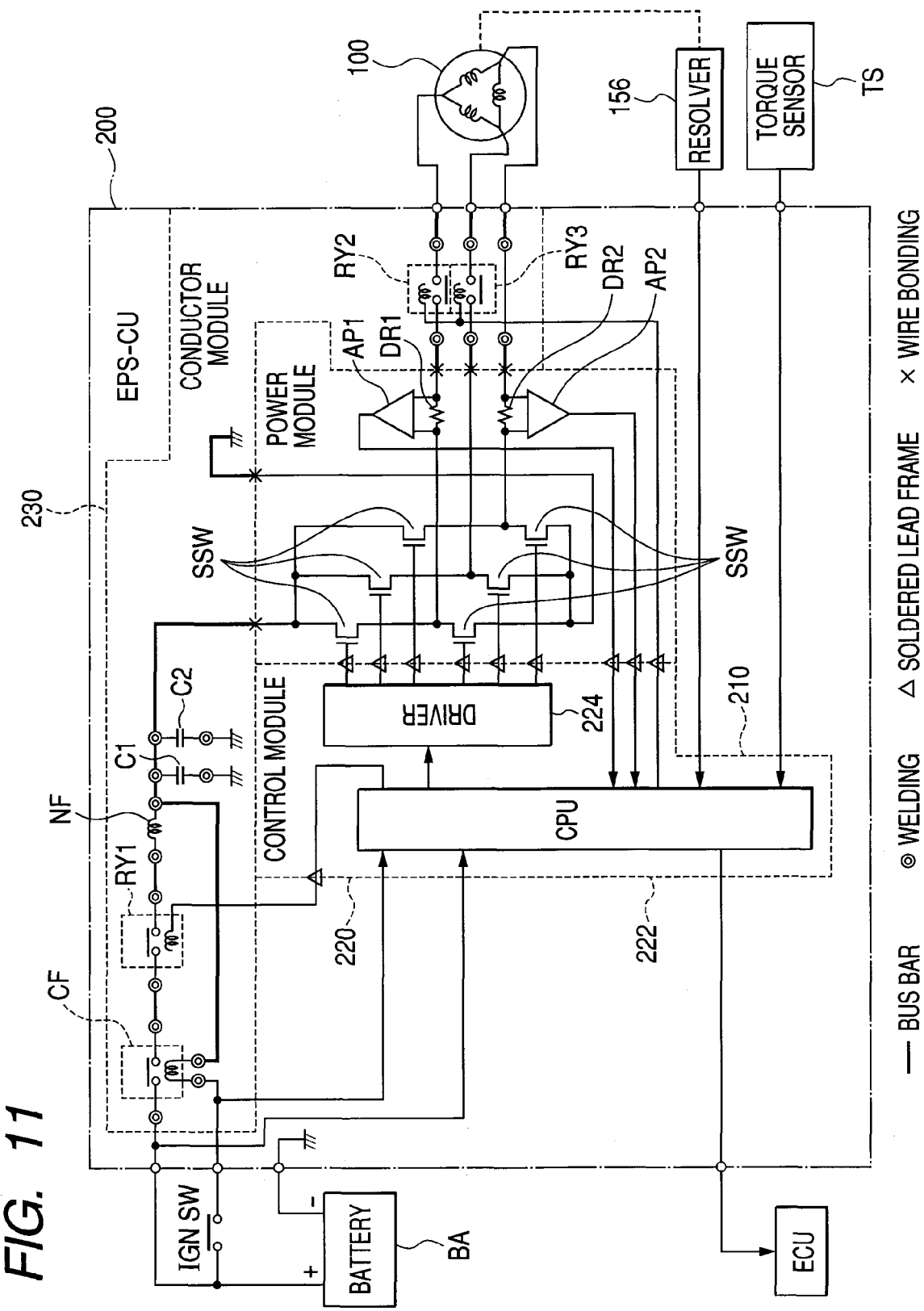
FIG. 11 is a circuit diagram representing the circuit configuration of the controller for controlling the DC brushless motor for electrical power steering of an embodiment in the present invention.

FIG. 11 is a circuit diagram representing the circuit configuration of the controller for controlling the DC brushless motor for electrical power steering of the present embodiment. The same reference numerals as those in FIG. 10 indicate the same parts.

The motor controller 200 comprises a power module 210, control module 220 and conductor module 230.

The conductor module 230 is integrally molded with the bus bar 230B. In the drawing, the bold solid line indicates the bus bar. In the conductor module 230, the common filter CF, normal filter NF, capacitors CC1 and CC2, and relay RY1 are connected to the bus bar for connecting the collector terminal of the semiconductor switching device SSW, as shown in the drawing.

The portion indicated by a double circle denotes the welded connection. For example, the four terminals of the common filter CF are connected to the bus bar terminal by welding. Two terminals of the normal filter, two terminals of each of ceramic capacitors CC1 and CC2 and two terminals of the relay RY1 are also connected to the terminals of the bus bar by welding. The common filter CF and normal filter NF are provided to avoid radio noise.

A bus bar is also used for the wire for supplying motor current to the motor 100 from the power module 210. Relays RY2 and RY3 are connected by welding to the bus bar wire leading from the power module 210 to the motor 100. Relays RY1, RY2 and RY3 are used for the fail safe system to cut off power to the motor in the event of motor failure or control module trouble.

The control module 220 is provided with a CPU 222 and driver circuit 224. Based on the torque detected by the torque sensor TS and the rotary position of the motor 100 detected by the resolver 156, the CPU 222 outputs to the driver circuit 224 the control signal for controlling on-off operation of the semiconductor switching device SSW of the power module 210. Based on the control signal from the CPU 222, the driver circuit 224 controls the on-off drive of the semiconductor switching device SSW of the power module 210. The motor current supplied from the power module 210 to the motor is detected by the motor current detection resistors (shunt resistors) DR1 and DR2 and is amplified by the amplifiers AP1 and AP2. Then the current is inputted into the CPU 222. The CPU 222 provides feedback control to ensure that the motor current will be the target. The CPU 222 is connected by the external engine control ECU, CAN and others, whereby information is exchanged.

The Δ (inverted delta symbol) in the drawing indicates the portions connected by welding using the lead frame. Use of the lead frame reduces the stress. The configuration of the lead frame will be described with reference to FIG. 15. Welding using the lead frame is utilized for electrical connection between the control module 220 and power module 210 or conductor module 230.

The power module 210 comprises six semiconductor switching devices SSW such as IGBT. The semiconductor switching device SSW is serially connected to the upper and lower arms for each of three phases. In the drawing, a cross "x" denotes an electrical connection by wire bonding. To be more specific, motor current is supplied to the motor 100 from the power module 210 through the bus bar of the conductor module 230, but this is a large current. Accordingly, connection is made by wire bonding that allows a large current to run, and reduces the stress. The details will be described later with reference to FIG. 16. The power supply line and earth line for the semiconductor switching device SSW are also connected wire bonding.

Figure 12:
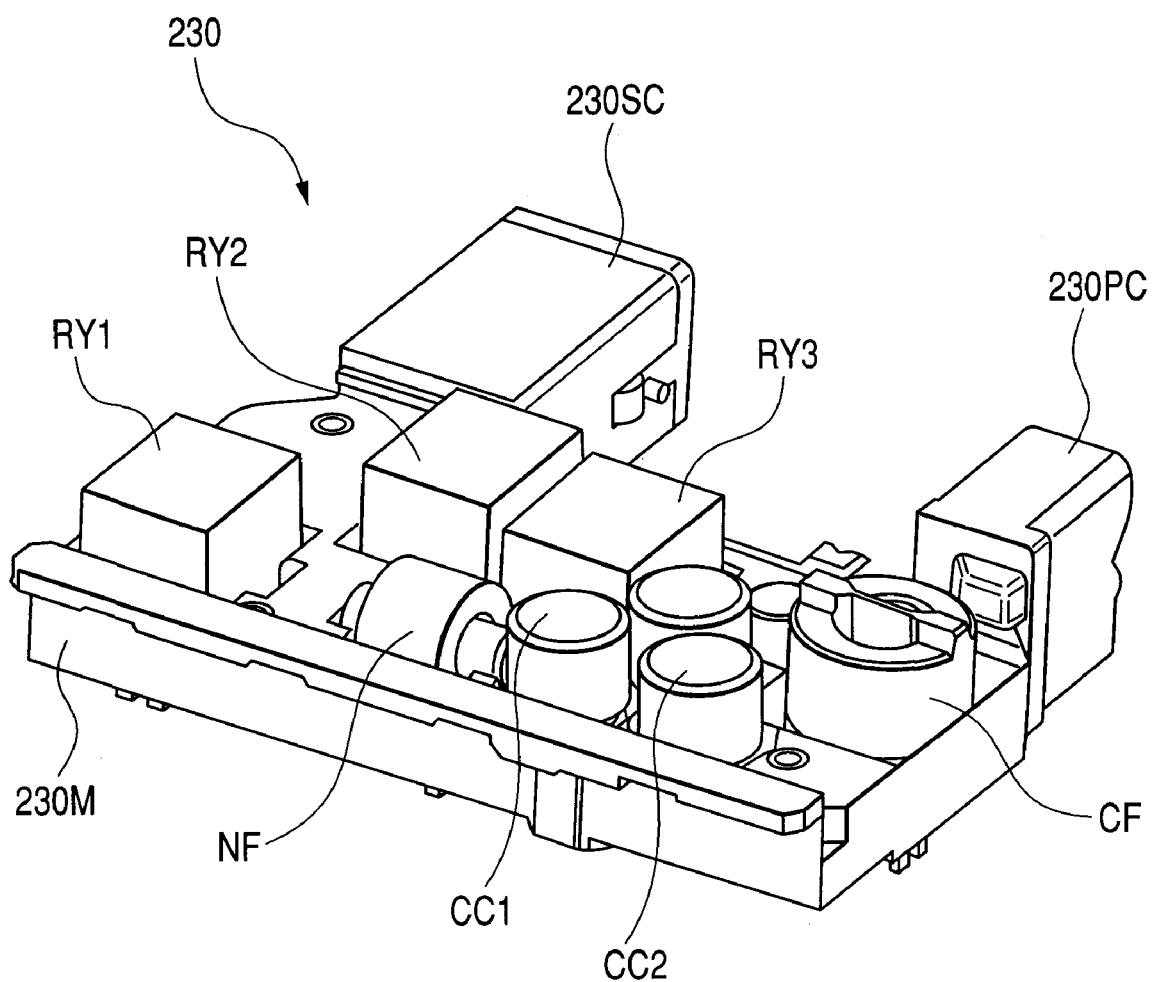
FIG. 12 is a perspective bottom view showing the configuration of conductor module of the controller for controlling the DC brushless motor for electrical power steering of an embodiment in the present invention.

Referring to FIG. 12, the following describes the configuration of the conductor module 230 of the controller for controlling the DC brushless motor for electrical power steering of the present embodiment.

FIG. 12 is a perspective bottom view showing the configuration of conductor module of the controller for controlling the DC brushless motor for electrical power steering. The same reference numerals in FIGS. 10 and 11 indicate the same parts. FIG. 12 shows the bottom view of the conductor module 230 shown in FIG. 10.

The conductor module 230 is formed by molding, and is provided with holes for inserting the terminals of electrical parts such as the common filter CF, normal filter NF, capacitors CC1 and CC2, and relays RY1, RY2 and RY3. Electrical parts are arranged on these positions, and the terminals of the electrical parts and terminals of the bus bar are connected by welding on the illustrated bottom surface side.

Figure 13:
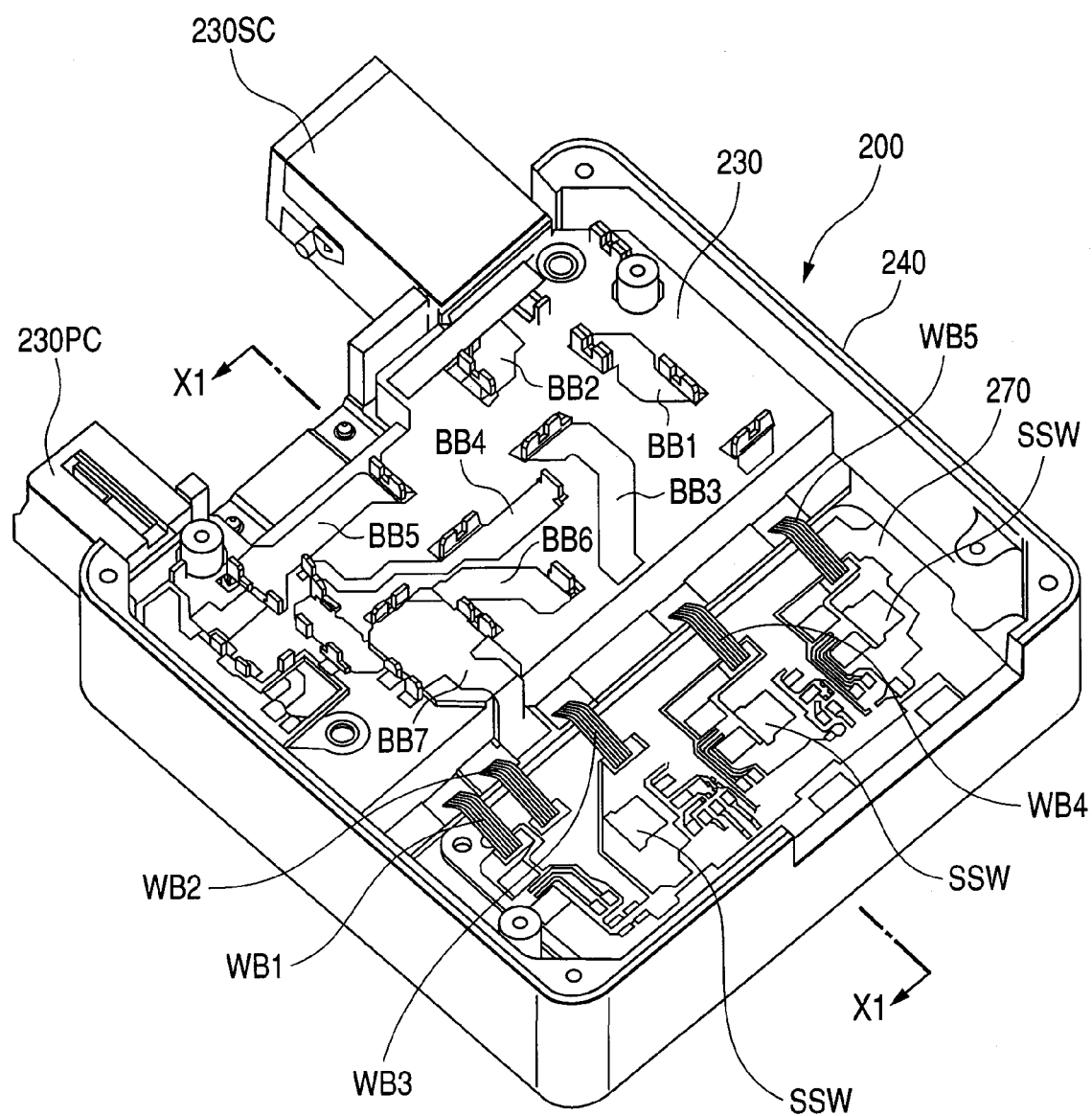
FIG. 13 is a perspective view representing the configuration of the controller for controlling the DC brushless motor for electrical power steering of an embodiment in the present invention.

FIG. 13 is a perspective view representing the configuration of the controller for controlling the DC brushless motor for electrical power steering of the present embodiment.

In FIG. 13, the power module 210 and conductor module 230 are arranged in the case 240. The control module 220 is not yet mounted in position.

The conductor module 230 and a plurality of bus bars BB1, BB2, BB3, BB4, BB5, BB6 and BB7 are formed by molding. The bus bar terminals and terminals of the electrical parts such as the common filter CF, normal filter NF, capacitors CC1 and CC2, and relays RY1, RY2 and RY3 are connected by welding.

The power module 210 is provided with a plurality of semiconductor switching device SSW. Electrical connections are provided by wire bonding WB1, WB2, WB3, WB4 and WB5 at five positions between the power module 210 and conductor module 230. For wire bonding WB1, for example, five aluminum wires having a diameter of 500 μm are connected in parallel.

The power module 210 and conductor module 230 are arranged opposite to each other on one and the same flat plane. To be more specific, the power module 210 is mounted on one side of the case 240, and the conductor module 230 is located on the other side of the case 240. This arrangement ensures easier wire bonding work.

Figure 14:
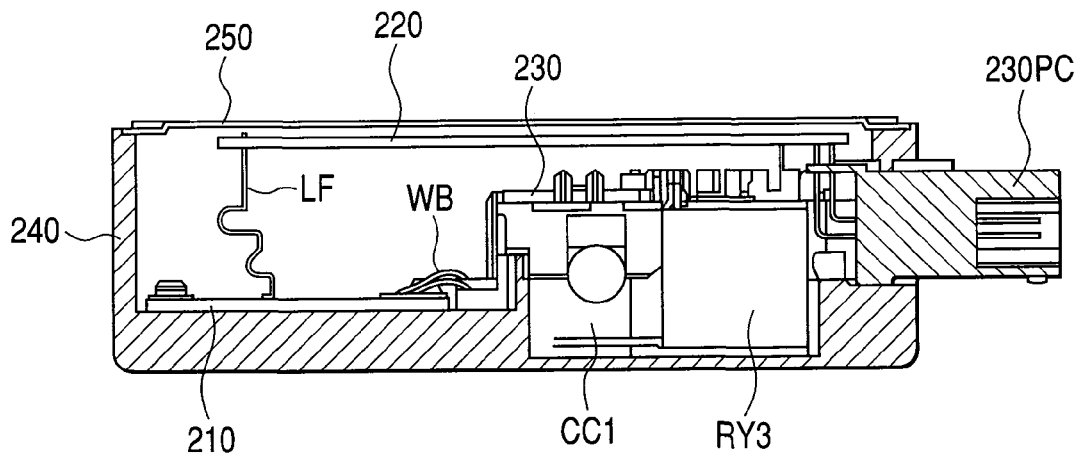
FIG. 14 is a cross sectional view of the controller for controlling the DC brushless motor for electrical power steering of an embodiment in the present invention.

FIG. 14 is a cross sectional view of the controller for controlling the DC brushless motor for electrical power steering of the present embodiment. It shows the cross sectional configuration at position X1-X1 of FIG. 13. The same reference numerals in FIGS. 10 through 13 indicate the same parts.

The power module 210 and conductor module 230 are fixed by screws on the inner bottom surface of the case 240. As shown in FIG. 11, the conductor module 230 are provided with electrical parts and is welded together with the bus bar, thereby forming an integral module, which is fixed by screws. Then electrical connection between the power module 210 and conductor module 230 is provided by wire bonding WB.

The lower end of the lead frames LF is secured on the power module 210 by soldering. Under this condition, the control module 220 is placed thereon and is secured the other end of the lead frames LF by soldering. The control module 220 is secured on the case 240 by screws. A shield cover 250 is then fixed on the case 240 by screws.

Figure 15:
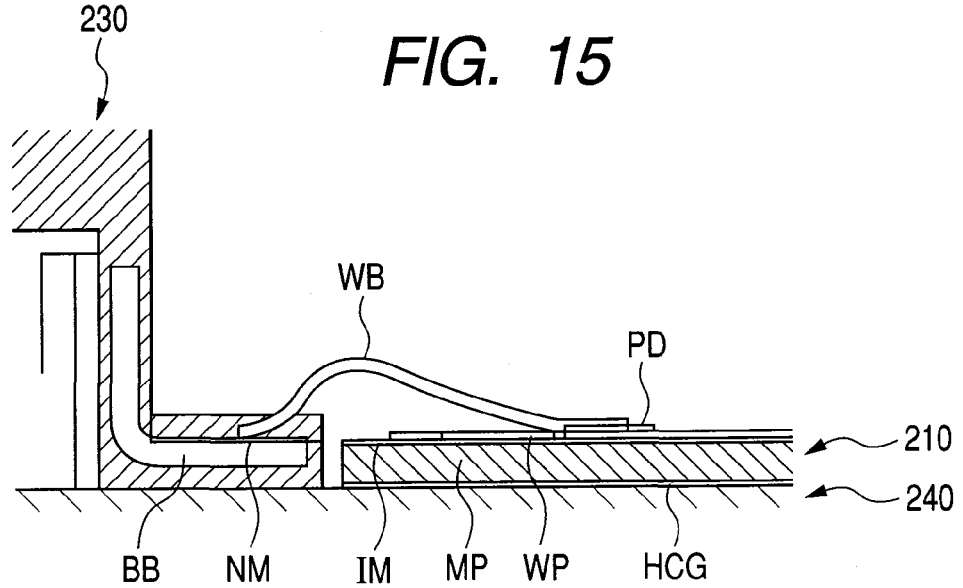
FIG. 15 is a cross sectional view representing the major portions of the controller for controlling the DC brushless motor for electrical power steering of an embodiment in the present invention.

FIG. 15 is a cross sectional view representing the major portions of the controller for controlling the DC brushless motor for electrical power steering of the present embodiment. The same reference numerals as those in FIG. 14 indicate the same parts.

FIG. 15 indicates a detailed structure of the connections between the power module 210 and conductor module 230.

The power module 210 is provided with a semiconductor switching device SSW. A metal substrate MP (e.g. aluminum (Al) and copper (Cu)) is used to release the heat thereof. Heat conduction grease HCG is applied between the metal substrate MP and case 240. Thus, the heat generated from the semiconductor switching device SSW is released from the aluminum case 240 through therebetween heat conduction grease HCG. A wiring pattern WP is formed on the metal substrate MP through the insulation film 1M. An insulation layer of low elasticity is used to produce the insulation film 1M. The wiring pattern WP is obtained by etching and patterning a 175 μm-thick copper (Cu) foil. An aluminum pad PD used for electrical connection is formed on the wiring pattern WP. A nickel film is formed on the back of the aluminum pad PD.

For the conductor module 230, in the meantime, a bus bar BB is formed. On the end of the bus bar BB, a nickel film is formed on the surface of the connection with the power module 210.

Wire bonding WB is used for connection between the bus bar BB of the power module 210 and the aluminum pad PD of the conductor module 230 by means of an aluminum wire.

As described above, the metallic substrate is used as a conductor module 230. This arrangement causes expansion coefficient to be increased. Since expansion and compression are repeated in conformity to the temperature change of the conductor module 230, stress is applied to the electrical connection with the power module 210. Because a large current runs between the power module 210 and conductor module 230, such a conductor as a bus bar is preferably utilized for connection. However, this may cause separation of the connection due to thermal stress. To solve this problem, an aluminum wire susceptible to reversible change is used, as in the present embodiment. This allows thermal deformation of the conductor module 230 to be absorbed by the aluminum wire, with the result that stress is not applied to the electrical connection. This provides a stress-free structure. However, to allow a large current to flow, five aluminum wires having a diameter of 500 μm are connected in parallel.

A wire pattern is obtained by etching and patterning a 175 μm-thick copper (Cu) foil. If the thickness is in the range from 105 through 200 μm, for example, resistance can be reduced, and the amount of heat generation can also be reduced in the face of a large current. It is more preferably to use a wire pattern having a thickness of 145 through 175 μm. Use of a wire pattern having a thickness of 145 μm or more allows the resistance to be reduced as compared to the thickness of 105 μm. The amount of heat generation can also be reduced in the face of a large current. Further, when a copper foil having a thickness of 200 μm is patterned by etching, the pattern pitch will be increased and a small chip resistor or chip capacitor may not be installed in some cases. If the thickness is 175 μm or more, smaller chip parts can be utilized.

Figure 16:
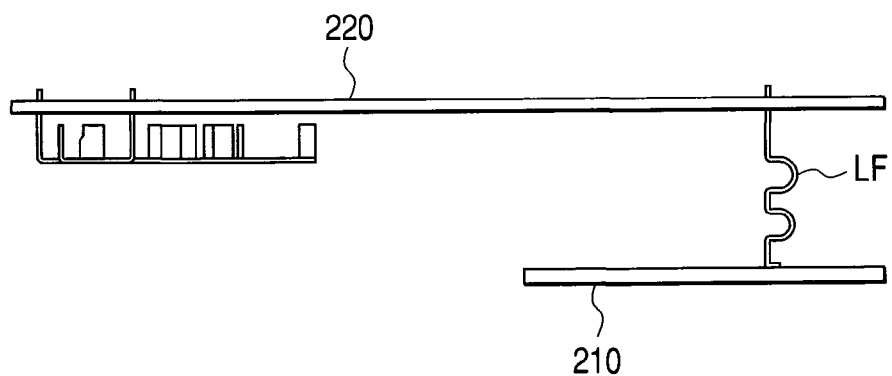
FIG. 16 is a cross sectional view representing the major portions of the controller for controlling the DC brushless motor for electrical power steering of an embodiment in the present invention.

FIG. 16 is a cross sectional view representing the major portions of the controller for controlling the DC brushless motor for electrical power steering of the present embodiment. The same reference numerals as those in FIG. 14 indicate the same parts.

The power module 210 and control module 220 are connected by the lead frames LF. The lead frames LF used in the present embodiment is made of a brass sheet material having a thickness of 0.15 mm, for example, and has a bend at some midpoint as shown in the drawing. As described above, the metal substrate MP is used as the substrate of the power module 210. Accordingly, the aforementioned lead frames LF is used to prevent thermal stress from being applied to the electrical connection between the power module 210 and control module 220 by thermal stress. Soldering is used for connection between the power module 210 and one end of the lead frames LF, and between the control module 220 and the other end of the lead frames LF. This arrangement provides signal line connection with a stress-free structure.

Figure 17:
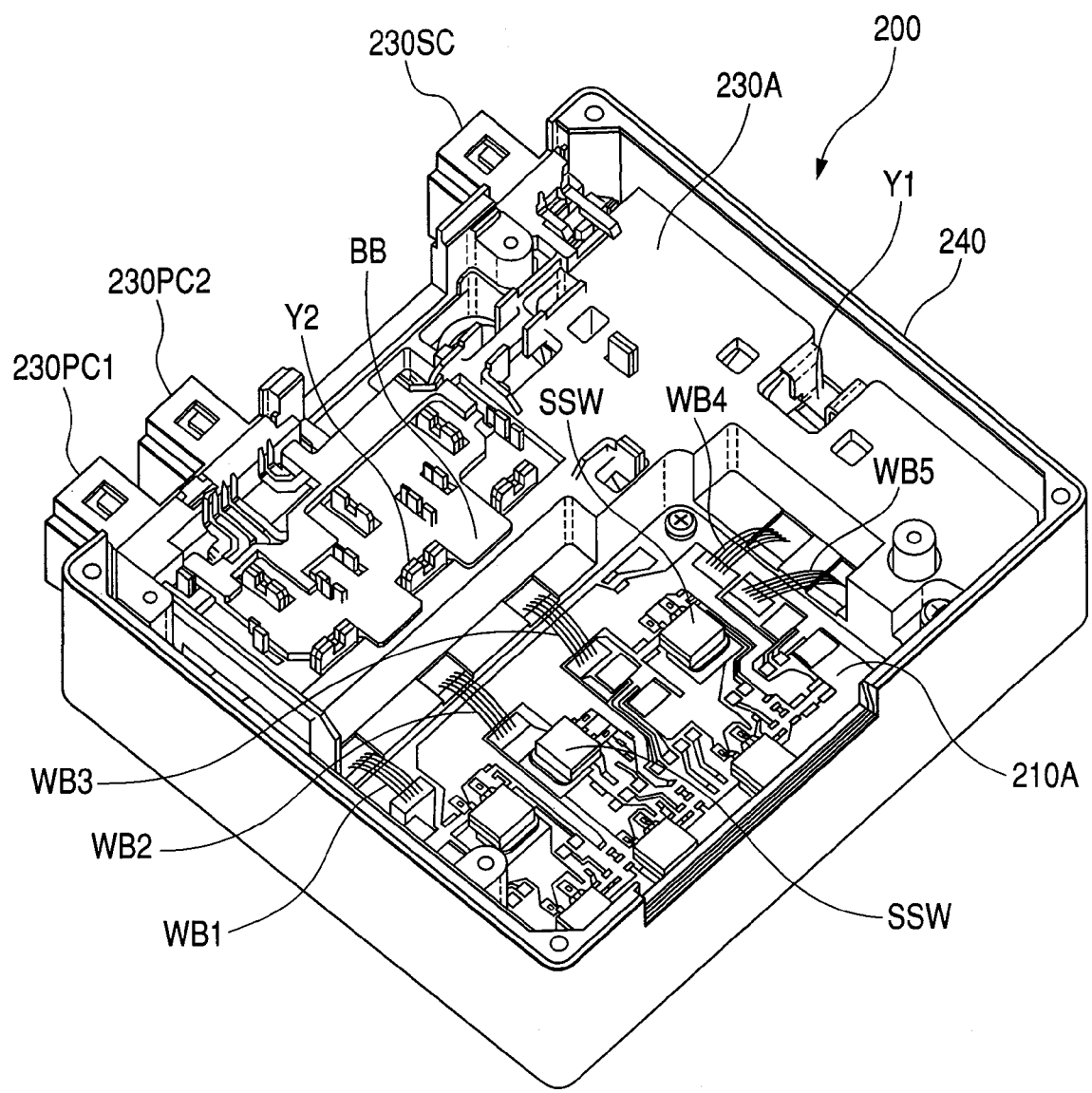
FIG. 17 is a perspective view representing another configuration of the controller for controlling the DC brushless motor for electrical power steering of an embodiment in the present invention.

Referring to FIG. 17, the following describes another configuration of the controller for controlling the DC brushless motor for electrical power steering of the present embodiment.

FIG. 17 is a perspective view representing another configuration of the controller for controlling the DC brushless motor for electrical power steering of the present embodiment. The same reference numerals in FIGS. 10 through 16 indicate the same parts.

Basically, the structure of the present embodiment is the same as shown in FIGS. 10 and 12, and the circuit configuration is the same as shown in FIG. 11. FIG. 17 shows the power module 210 and conductor module 230A mounted in the case 240, where the control module 220 is not yet mounted.

In this example, the configuration of the conductor module 230A is slightly different from that of the conductor module 230 illustrated in FIG. 13. To be more specific, the conductor module 230A is L-shaped in its planer geometry, as compared with the conductor module 230 shown in FIG. 13 being rectangular. The terminals of the electrolytic capacitor and ceramic capacitor are fixed to the bus bar by welding at the portion Y1. At another portion Y2, the terminals of the relay, normal filter and common filer are secured to the bus bar by TIG welding (arc welding), as in FIG. 13.

As described above, according to the present embodiment, welding is used for connection between the power module 210 and conductor module 230. Connection between the control module 220 and power module 210 is provided by soldering. According to this method, the portion exposed to a large current is connected by welding, whereby melting of welding connection is avoided and the reliability is improved. Other positions are connected by soldering, thereby improving the manufacturability.

Connection between the power module 210 and conductor module 230 is provided by wire bonding. This arrangement reduces the stress on a large current line. Further, parallel connection of a plurality of wires allows a large current to run.

The power module 210 and conductor module 230 are arranged on the same plane opposed to each other. To be more specific, the power module 210 and conductor module 230 are arranged on one side of the case 240. The conductor module 230 is placed on the other side of the case 240. This arrangement ensures easier wire bonding work.

What is claimed is:

1. A DC brushless motor for electrical power steering for outputting the steering torque, controlled by a power conversion apparatus for converting the power obtained from an on-board power source, into polyphase a.c. power and for outputting the power, said DC brushless motor for electrical power steering comprising:
a frame;
a stator secured on said frame;
a rotor arranged opposite to said stator through an air gap;
a flange for blocking both ends of the frame in the axial direction; and
a sensor for checking the magnetic pole position of the rotor
said stator comprising;
a stator core; and
a polyphase stator coil built in said stator core;
said stator core, formed by connecting a plurality of split core pieces, comprising:
an annular back core; and
a plurality of tee cores projected radially from said back core;
wherein a slot is formed on said tee core adjacent to said stator core, and said stator coil is composed of a plurality of unit coils, and is incorporated in said slot;
said rotor comprising:
a shaft;
a rotor core provided on the shaft; and
a plurality of magnets fixed onto the surface of the outer periphery of the rotor core;
said DC brushless motor for electrical power steering further characterized in that said stator core and stator coil are molded by a molding agent, with the stator coil incorporated in the stator core, said shaft being rotatably supported by a bearing, said bearing being arranged on the flange, one side of said flange being provided with a recess, said recess, as a cylindrical member concentric with the shaft, being located inward of the axial end of the frame and extending to the position opposed to the coil end, and one side of said bearing being arranged on the position of the recess radially opposite to the coil end.

2. The DC brushless motor for electrical power steering described in claim 1, wherein the sensor is arranged on the axial end of the frame, and the flange with the recess arranged thereon blocks one of the axial ends of the frame, equipped with the sensor.

3. The DC brushless motor for electrical power steering described in claim 2, wherein one end of said shaft in the axial direction expends further in the axial direction than one side of the bearing and reaches said recess, and said sensor is arranged in the air gap between the outer peripheral surface of the shaft and the peripheral surface of the recess.

4. The DC brushless motor for electrical power steering described in claim 3, said sensor comprising:
a census tester with a coil wound on the core; and
a sensor rotor arranged opposite to the census tester;
wherein said census tester is secured on the peripheral surface of the recess, while the sensor rotor is secured on the outer peripheral surface of the shaft so as to be positioned opposite to the census sensor through the air gap.

5. The DC brushless motor for electrical power steering described in claim 1, wherein a plurality of unit coils are electrically connected for each phase by the connection member arranged on one side of the coil end, and the flange equipped with said recess blocks the end on the side axially opposite to the coil end equipped with said connection member.

6. The DC brushless motor for electrical power steering described in claim 1, wherein the other end of the flange has a recess on the side axially opposite to the coil end, said recess on the other end of the flange being engaged with the tip of the coil end.

7. The DC brushless motor for electrical power steering described in claim 1, wherein the coil end opposite axially to the other end of the flange is covered with said molding agent so that an air gap is formed between the frame and air space; the other end of said flange provided with an annular protrusion extending in the axial direction, and said protrusion being engaged with the air gap when the other end of the flange is secured on the frame.

* * * * *